(12) United States Patent
Suzuki et al.

(10) Patent No.: US 9,827,873 B2
(45) Date of Patent: Nov. 28, 2017

(54) ELECTRIC VEHICLE CONTROL SYSTEM

(71) Applicant: HITACHI AUTOMOTIVE SYSTEMS, LTD., Hitachinaka-shi, Ibaraki (JP)

(72) Inventors: Keisuke Suzuki, Kawasaki (JP); Hitoshi Kobayashi, Machida (JP); Tatsuyuki Yamamoto, Isehara (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 0 days.

(21) Appl. No.: 14/914,365

(22) PCT Filed: Aug. 8, 2014

(86) PCT No.: PCT/JP2014/071055
§ 371 (c)(1),
(2) Date: Feb. 25, 2016

(87) PCT Pub. No.: WO2015/029752
PCT Pub. Date: Mar. 5, 2015

(65) Prior Publication Data
US 2016/0200324 A1    Jul. 14, 2016

(30) Foreign Application Priority Data

Aug. 30, 2013  (JP) ................................ 2013-178904

(51) Int. Cl.
*B60W 10/08*    (2006.01)
*B60L 15/20*    (2006.01)
(Continued)

(52) U.S. Cl.
CPC ......... *B60L 15/2009* (2013.01); *B60L 3/0076* (2013.01); *B60L 3/0084* (2013.01);
(Continued)

(58) Field of Classification Search
CPC combination set(s) only.
See application file for complete search history.

(56) References Cited

U.S. PATENT DOCUMENTS 6,086,166 A    7/2000   Fukasawa
2004/0054450 A1  3/2004   Nakamura et al.
(Continued)

FOREIGN PATENT DOCUMENTS

EP    2 055 588 A2    5/2009
JP    2007-074817 A    3/2007
(Continued)

*Primary Examiner* — Edward J Pipala
(74) *Attorney, Agent, or Firm* — Foley & Lardner LLP

(57) ABSTRACT

Provided is an electric vehicle control system capable of securing good response and slip stopping property with respect to changes in a road surface condition. The system includes a vehicle controller configured to calculate a driver's demand torque command value according to a driver's accelerating or braking operation, a first communication device capable of communicating between a hydraulic controller and a motor controller, and a second communication device capable of communicating between the vehicle controller and the motor controller. The system includes a control system in which the hydraulic controller transmits a motor torque command value to the motor controller through the first communication device; the vehicle controller transmits the driver's demand torque command value to the motor controller through the second communication device; and the motor controller selects either one of the received motor torque command value and the received driver's demand torque command value as the command value.

20 Claims, 15 Drawing Sheets

(51) Int. Cl.
- *B60R 16/023* (2006.01)
- *B60L 3/00* (2006.01)
- *B60L 3/10* (2006.01)
- *B60L 3/12* (2006.01)
- *B60L 7/18* (2006.01)
- *B60L 7/26* (2006.01)
- *B60W 10/184* (2012.01)
- *B60W 30/18* (2012.01)
- *B60W 50/00* (2006.01)

(52) U.S. Cl.
CPC ............... *B60L 3/102* (2013.01); *B60L 3/106* (2013.01); *B60L 3/12* (2013.01); *B60L 7/18* (2013.01); *B60L 7/26* (2013.01); *B60L 15/20* (2013.01); *B60R 16/023* (2013.01); *B60W 10/08* (2013.01); *B60W 10/184* (2013.01); *B60W 30/18172* (2013.01); *B60L 2240/423* (2013.01); *B60L 2240/461* (2013.01); *B60L 2250/26* (2013.01); *B60L 2260/44* (2013.01); *B60W 2050/0006* (2013.01); *B60W 2050/0045* (2013.01); *B60W 2050/0094* (2013.01); *B60W 2550/148* (2013.01); *Y02T 10/645* (2013.01); *Y02T 10/7275* (2013.01); *Y02T 90/16* (2013.01)

(56) References Cited

U.S. PATENT DOCUMENTS

| | | |
|---|---|---|
| 2007/0075659 A1 | 4/2007 | Uenodai et al. |
| 2007/0241611 A1 | 10/2007 | Shimada et al. |
| 2009/0101428 A1* | 4/2009 | Itoh .................. B60T 8/175 180/197 |
| 2010/0174430 A1 | 7/2010 | Irie |
| 2010/0268408 A1 | 10/2010 | Yuki |
| 2010/0298092 A1* | 11/2010 | Tsuchikawa ........... B60K 6/365 477/71 |
| 2012/0158266 A1* | 6/2012 | Miyazaki ................. B60L 7/18 701/70 |

FOREIGN PATENT DOCUMENTS

| | | |
|---|---|---|
| JP | 2007-288904 A | 11/2007 |
| JP | 2008-306815 A | 12/2008 |
| WO | WO 2011/027393 A1 | 3/2011 |

* cited by examiner (a)

(b)

(c)

ELECTRIC VEHICLE CONTROL SYSTEM

TECHNICAL FIELD

The invention relates to a control system for an electric vehicle.

BACKGROUND ART

A conventionally-known control system for an electric vehicle is described in Japanese Unexamined Patent Application Publication No. 2007-74817. According to the electric vehicle mentioned in the document, when a TCS demand torque is outputted from a TCSECU 22, a switching command is outputted to a power drive unit 15 through a drive-train torque calculation unit 43 and a motor torque control unit 42 of a controller 23 to control motor torque.

SUMMARY

A transmission path of the torque command transmits the command from the TCSECU 22 to the controller 23 and then outputs the command from the controller 23 to a motor. In other words, communication intervenes twice in the process of transmitting the torque command, which causes a delay in communication. If a control gain is increased to reduce an effect of the delay in communication, the control system is destabilized. The control gain then has to be set low. On the other hand, the low control gain makes it difficult to improve response and slip stopping property with respect to changes in a road surface condition (friction factor, for example). The invention has been made in light of the foregoing problem. It is an object of the invention to provide an electric vehicle control system capable of ensuring good response and slip stopping property with respect to changes in a road surface condition.

To accomplish the object, an electric vehicle control system of the invention includes a vehicle controller configured to calculate a driver's demand torque command value according to a driver's accelerating or braking operation, a first communication device configured to enable communication between a hydraulic controller and a motor controller, and a second communication device configured to enable communication between a vehicle controller and the motor controller, the electric vehicle control system being provided with a control system in which the hydraulic controller transmits a motor torque command value to the motor controller through the first communication device; the vehicle controller transmits the driver's demand torque command value to the motor controller through the second communication device; and the motor controller selects the received motor torque command value or the received driver's demand torque command value as a command value for generating a driving/braking force in the electric motor.

DESCRIPTION OF EMBODIMENTS

Embodiment 1

Figure 1:
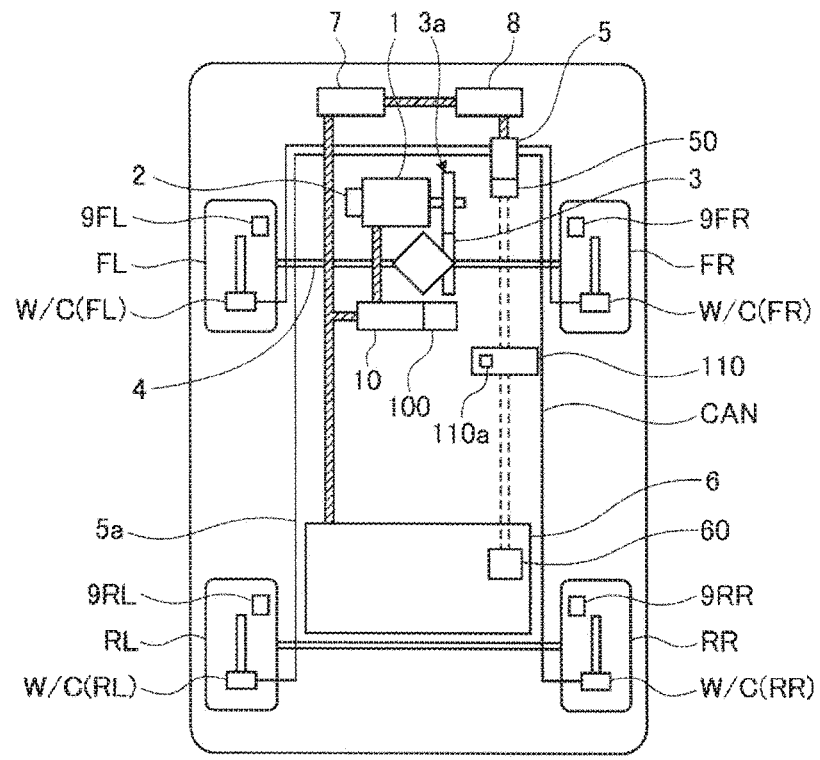
FIG. 1 is a system chart showing a structure of an electric vehicle of an Embodiment 1.

FIG. 1 is a system chart showing a structure of an electric vehicle of an Embodiment 1. The electric vehicle is a front-wheel drive vehicle and includes front wheels FR and FL functioning as drive wheels and rear wheels RR and RL functioning as driven wheels.

The wheels are respectively provided with wheel cylinders W/C(FR), W/C(FL), W/C(RR), and W/C(RL) (referred to also simply as W/C), each of which pushes brake pads against a brake rotor that rotates integrally with a tire to generate a frictional braking force, and wheel velocity sensors 9(FR), 9(FL), 9(RR), and 9(RL) (referred to also simply as 9), each of which detects a wheel velocity of a corresponding wheel. The wheel cylinders W/C are connected with a hydraulic unit 5 through fluid-pressure pipes 5a.

The hydraulic unit 5 includes a plurality of electromagnetic valves, a reservoir, a motor for a pump, and a brake controller 50. According to a command from the brake controller 50, the hydraulic unit 5 controls the driving of the electromagnetic valves and the motor for a pump, whereby controls a wheel-cylinder fluid pressure of each wheel. The hydraulic unit 5 may be a well-known brake-by-wire unit or a brake unit with a hydraulic circuit in which vehicle stability control is implementable. There is no particular limitation.

An electronic motor 1 functioning as a drive source is provided with a resolver 2 which detects a motor rotation angle. The electric motor 1 is connected with a differential gear 3 via a deceleration mechanism 3a. A drive shaft 4 connected to the differential gear 3 is connected with the front wheels FR and FL. Installed in a rear portion of the vehicle are a high-voltage battery 6 which supplies the electric motor 1 with electric power for driving or recovers regenerative electric power, and a battery controller 60 which monitors and controls a battery condition of the high-voltage battery 6. An inverter 10 interposed between the high-voltage battery 6 and the electric motor 1 is controlled by a motor controller 100. The high-voltage battery 6 is connected with a battery 8 for auxiliary machine or accessories through a DC/DC converter 7 (component). The battery 8 for accessories functions as a driving power source of the hydraulic unit 5.

The electric vehicle of the Embodiment 1 is provided with a CAN communication wire functioning as an in-vehicle communication line which is connected with a plurality of controllers installed in the vehicle. Through the CAN communication wire, the brake controller 50, a vehicle controller 110, the battery controller 60 and the like are connected to one another to be capable of communicating information. Although not illustrated in FIG. 1, a power steering controller 20 configured to control a power steering device that assists a driver's steering operation and a meter controller 22 configured to control a speed meter that indicates vehicle speed are connected to the CAN communication wire. The power steering controller 20 is provided with a steering angle sensor 21 which detects a steering angle of a steering wheel.

Figure 2:
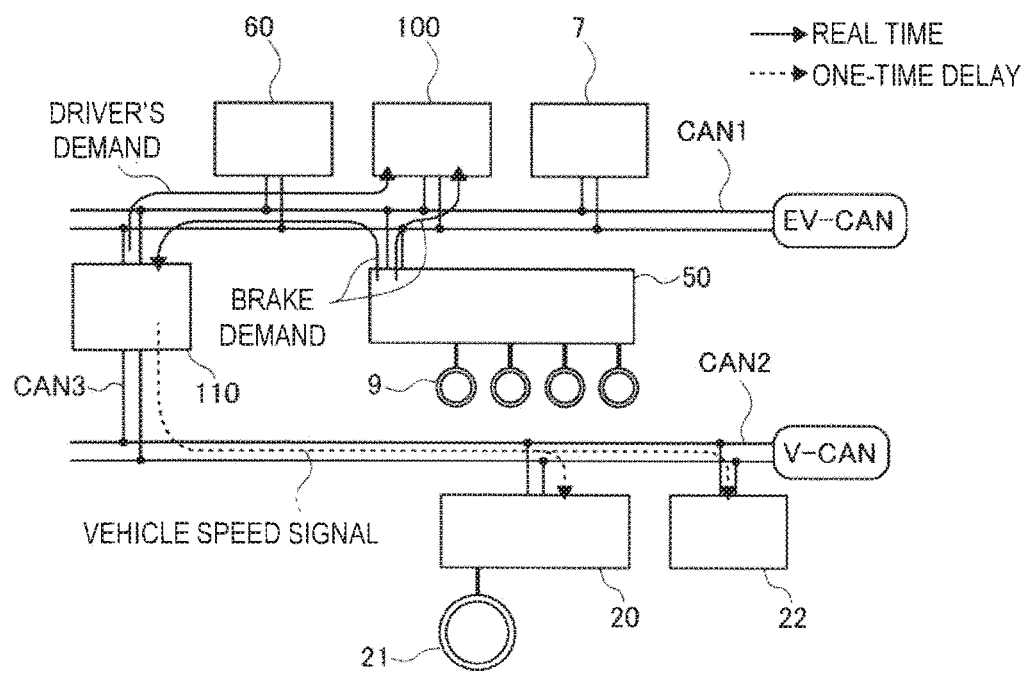
FIG. 2 is a schematic view showing connection of controllers of the Embodiment 1.

FIG. 2 is a schematic view showing the connection of the controllers of the Embodiment 1. In the electric vehicle of the Embodiment 1, the battery controller 60, the motor controller 100, the inverter 10, and the brake controller 50, which control a torque condition that effects between the drive wheels and a road surface, are collectively connected to a first CAN bus CAN1 (first communication device) as a single power train system. A chassis system including the power steering controller 20 and the meter controller 22 is connected to a second CAN bus CAN2 (second communication device).

The first CAN bus CAN1 and the second CAN bus CAN2 are connected to each other through a connection bus CAN3. The connection bus CAN3 is provided with the vehicle controller 110. Information transmitted and received through the first CAN bus CAN1 is received by the vehicle controller 110 interposed in the connection bus CAN3 and then outputted to the second CAN bus CAN2. Likewise, information transmitted and received through the second CAN bus CAN2 is received by the vehicle controller 110 interposed in the connection bus CAN3 and then outputted to the first CAN bus CAN1.

(Structure of Connection of the Controllers)

Figure 3:
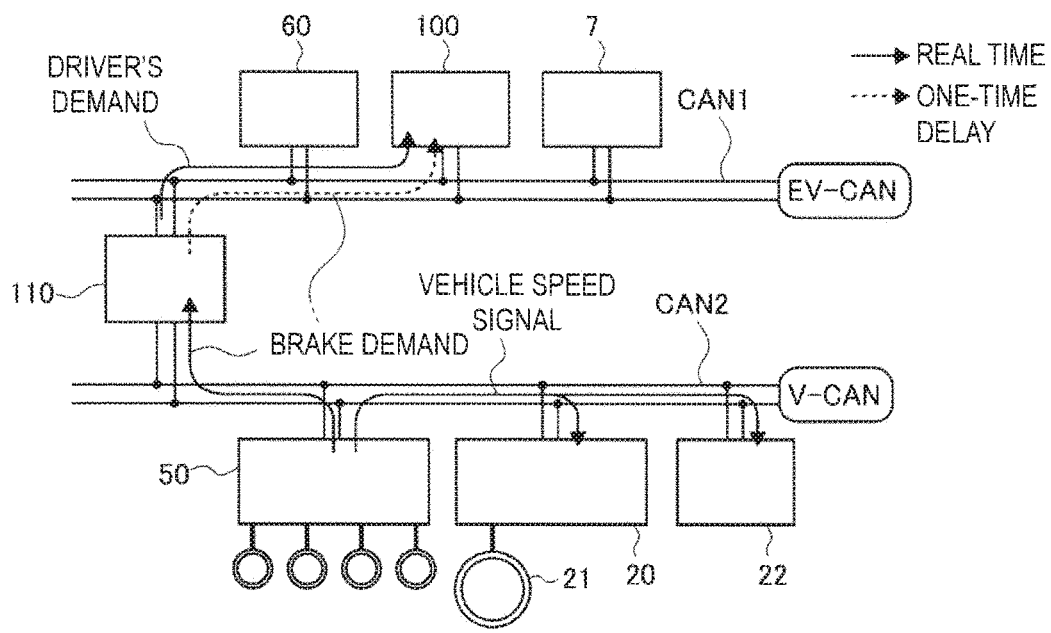
FIG. 3 is a schematic view showing the connection of controllers of a comparative example.

Reasons that the controllers are thus connected will be provided below in contrast with a schematic view showing connection according to a comparative example. FIG. 3 is the schematic view showing the connection of controllers of the comparative example. When a conventional control system of a vehicle is constructed, the brake controller 50 is connected to the second CAN bus CAN2 as illustrated in FIG. 3. This is because the control of a braise system has not been of a power train system, but has conventionally been the control of a chassis system. In light of development, systems, such as a Power train system system, a steering system, and a suspension system, developed as discrete systems. The systems discretely developed are integrated as a whole system for the vehicle by being connected to the CAN communication wire. The CAN communication wire allows a plurality of controllers to be easily connected together to be grouped, albeit limited in the number of controllers which can be connected. For this reason, according to conventional systems, the controllers are divided into a group in which the controllers of the chassis system are connected together and a group in which those of the power train system are connected together, and a vehicle controller is provided to a connection bus which connects the two groups, to thereby control the entire system according to a conventional system.

However, there have been situations in which a sufficient drivability is hard to secure with the structure of the above-described comparative example. For example, if a driver steps hard on an acceleration pedal when starting a vehicle, and a large torque is then outputted to drive wheels, a drive slip sometimes occurs. To suppress the slip, the brake controller 50 demands the vehicle controller 110 to suppress a slip. The vehicle controller 110 then outputs a demand, such as torque-down, to the motor controller 100 according to the demand received from the brake controller 50.

After the information which has passed through the second CAN bus CAN2 is received by the vehicle controller 110, the information is passed through the first CAN bus CAN1. A brake demand outputted from the brake controller 50 is therefore outputted to the motor controller 100 with a one-time delay of communication timing. Due to the delay, there is a case in which a drive slip cannot be effectively suppressed. Especially when the drive wheels slip, a rotational condition of the drive wheels is likely to change suddenly because the inertia of the drive wheels is extremely smaller than that of the vehicle. It is an idea to increase a control gain or communication speed. On the other hand, the CAN communication wire is designed so that various systems may be later connected to the wire without difficulty. Therefore, even if the control gain or a control period is increased only in the brake controller, the control gain or control period is restricted by the communication speed within the CAN communication wire, which makes it difficult to secure sufficient response.

To solve the above issue, in terms of the fact that the brake controller 50 is a system which controls torque between the drive wheels and the road surface, the Embodiment 1 places the brake controller 50 in the power train system and connects the brake controller 50 to the first CAN bus CAN1. In this case, vehicle speed information and the like outputted by the brake controller 50 are transmitted into the second CAN bus CAN2 with a slight delay. Judging from the magnitude of inertia of the vehicle, however, vehicle speed does not suddenly change, so that there is no problem.

(Issue Inherent in Electric Vehicles)

An issue inherent in electric vehicles will now be explained below. In conventional vehicle systems which control a power train system having an internal combustion engine by using wheel velocity data, in many cases the wheel velocity data and a torque-down demand are received from the brake controller 50 to be used. This is because, even if the control of the internal combustion engine is improved, there are limitations to response in which such contraption is actually reflected to an output torque, so that the response of CAN communication wires hardly comes to an issue as a bottleneck of the response required in development of a power train. For this reason, when the torque-down demand and the wheel velocity data are used in the development of the power train, in many cases control is implemented by using without change a wheel velocity detection performance developed in the development of brake systems. It is a fact that this basic design concept is often taken over when electric vehicles are developed.

An electric vehicle with the electric motor 1 connected to the drive wheels is much better in torque control response than a vehicle with an internal combustion engine. Such an electric vehicle enables more accurate drive-wheel slip control. When the good response of the electric motor 1 is intended to be utilized in control, the response of the CAN communication wires has been an issue. In light of these factors, for constructing a system utilizing the high response of the electric motor 1, a system construction is required, in which the wheel velocity data is received from the brake controller 50 as primary information, rather than secondary information, to calculate control amount.

Although it is important that the vehicle controller 110 which controls the entire vehicle monitors the entire vehicle before controlling the vehicle, if centralization in which all commands are outputted to the controllers after all information is collected is advanced too far, computation load of the vehicle controller 110 is increased. As a result, an extremely expensive controller is needed. Furthermore, the vehicle controller 110 outputs commands while taking information of low communication speed into account. For that reason, even the extremely expensive controller 110 cannot make it possible to develop a vehicle system with a good response. It is one idea to quickly transmit and receive all information. However, an increase in communication speed is a specification change which effects all the other controllers connected to the subject communication wire. It is very difficult to increase the communication speed of the entire system when the system is complicated.

The Embodiment 1 not only divides the structure of the CAN communication wires into the first CAN bus CAN1 and the second CAN bus CAN2 but also causes a lower-order controller than the vehicle controller 110 to make a certain amount of judgment and perform control, instead of making the vehicle controller 110 output all commands. More specifically, to enable the motor controller 100 to make a judgment of a final motor torque command value earlier than the vehicle controller 110, the system is configured to transmit a brake demand, which is outputted from the brake controller 50, directly to the motor controller 100. Moreover, the motor controller 100 is configured to be capable of reading not only the regular torque demand from the vehicle controller 110 but also the brake demand from the brake controller 50, and outputting a final motor torque command value according to a driving condition.

(Information Transmitted and Received by the Controllers)

Figure 4:
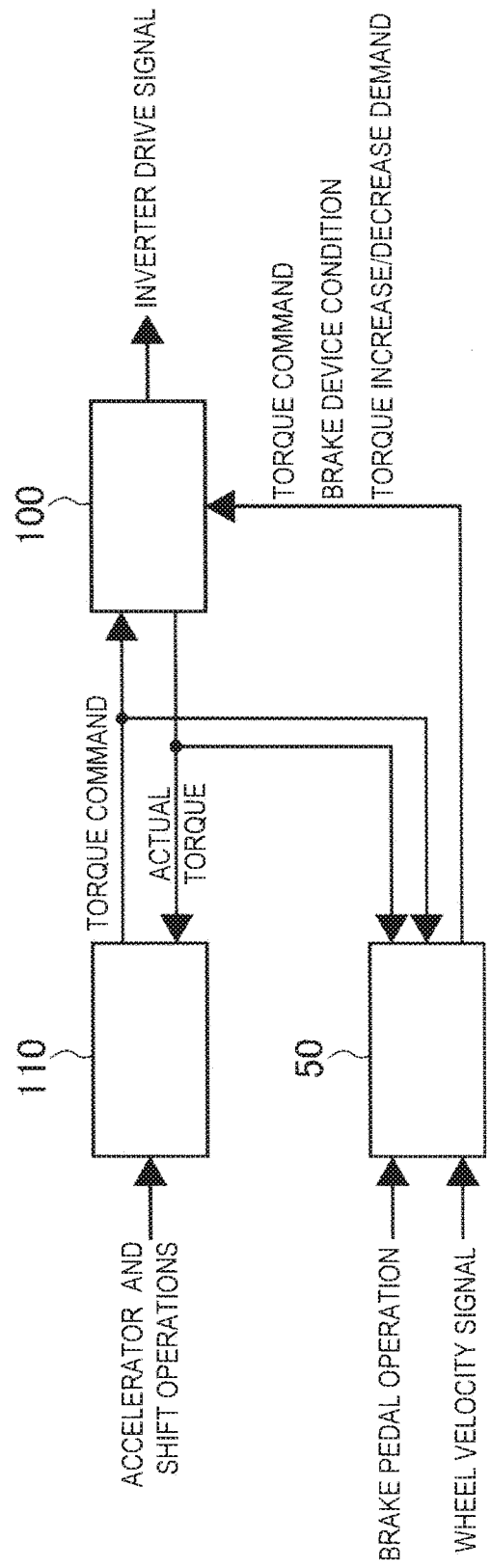
FIG. 4 is a control block diagram showing contents of information transmitted and received by the controllers of the Embodiment 1.

FIG. 4 is a control block diagram showing contents of information transmitted and received by the controllers of the Embodiment 1. The vehicle controller 110 inputs accelerator position information and shift position information, calculates a first torque command value based on a basic driver's demand torque and a result of other control processing, and outputs the first torque command value to the motor controller 100 and the brake controller 50. The brake controller 50 inputs an ON/OFF position of a brake switch indicative of a brake pedal operation and a wheel velocity signal of each wheel. For example, the brake controller 50 outputs a second torque command value based on a traction control demand, a brake device condition indicating whether the hydraulic unit 5 and the brake controller 50 are in normal operation, and a torque increase/decrease demand indicating if torque is required to be increased, decreased or neither increased nor decreased in response to a driver's demand.

The motor controller 100 compares the first torque command value with the second torque command value. If the brake device condition is normal, and the first and second torque command values match the torque increase/decrease demand, the motor controller 100 employs the second torque command value from the brake controller 50. If the foregoing conditions are not satisfied, the motor controller 100 employs the first torque command value. Due to the above judgments, even if there is a problem such as a communication failure, it is possible to prevent the motor controller 100 from operating against the intention of the driver and that of the brake controller 50.

(Details of Control in the Controllers)

Figure 5:
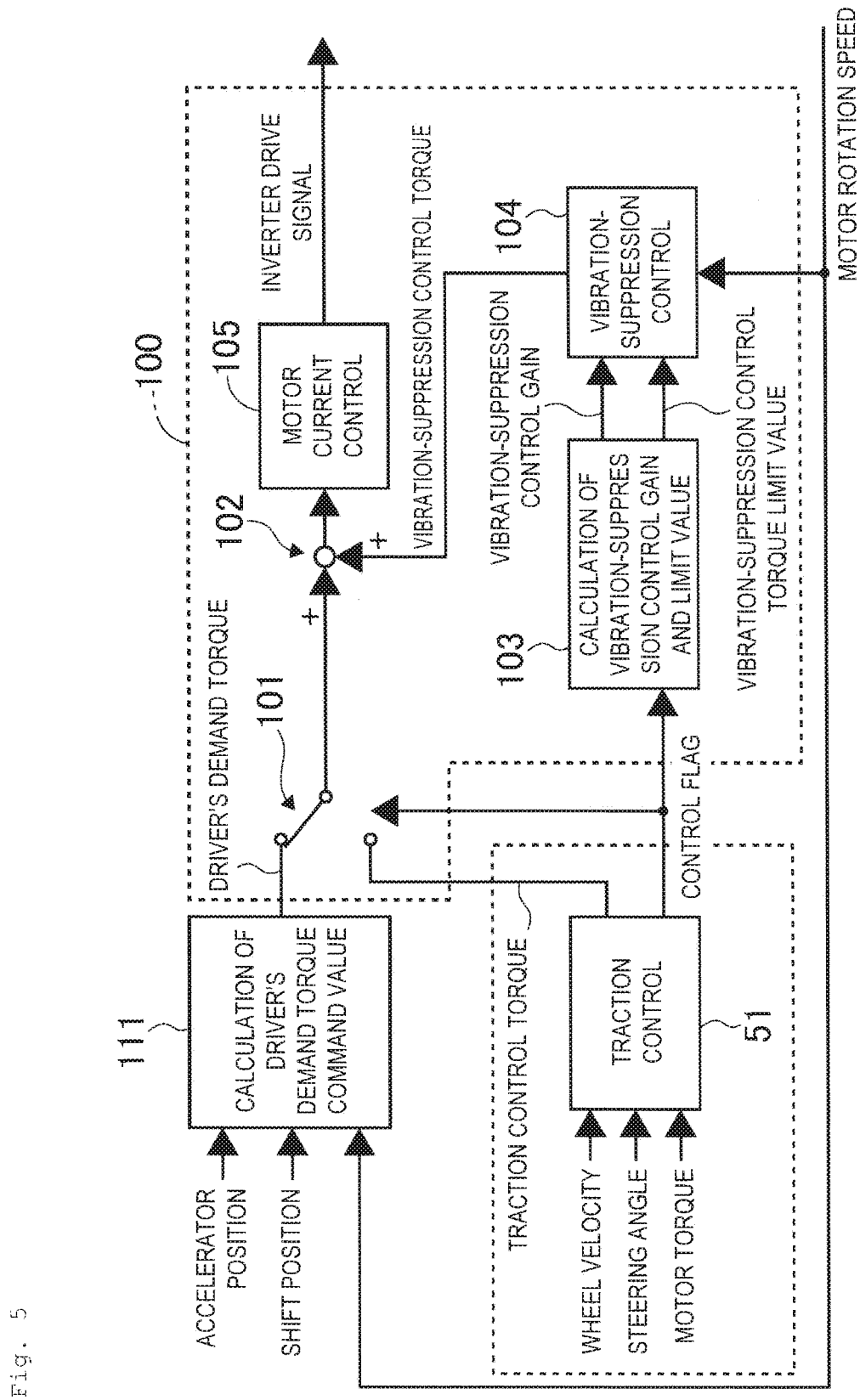
FIG. 5 is a control block diagram showing contents of control which is implemented according to a demand of traction control provided in a vehicle controller and a brake controller, and a motor controller according to the Embodiment 1.

FIG. 5 is a control block diagram showing contents of control which is implemented according to a demand of traction control provided in the vehicle controller and the brake controller, and the motor controller according to the Embodiment 1. FIG. 5 will be explained exclusively about the contents of the traction control. A driver's demand torque command value calculation unit 111 located in the vehicle controller 110 calculates a driver's demand torque (first torque command value) from an accelerator opening degree and the shift position, and outputs a result to the motor controller 100. A traction control unit 51 located in the brake controller 50 inputs wheel velocity information from a wheel velocity sensor 9, steering angle information from the steering angle sensor, and an actual motor torque outputted by the electric motor 1. The traction control unit 51 makes a judgment as to whether the drive wheels are in a drive slip state. If the drive wheels are in the drive slip state, the traction control unit 51 outputs a traction control torque (second torque command value) for suppressing a drive slip, and outputs a control flag to the motor controller 100, which indicates the contents of the control implemented within the brake controller 50.

The motor controller 100 includes a selector switch 101 configured to switch between the driver's demand torque and the traction control torque after deciding which command value should be selected according to the control flag; a torque addition unit 102 configured to add an aftermentioned vibration-suppression control torque to a torque command value TMCIN* which has been selected, and outputs a final torque command value; a motor current control unit 105 configured to output an inverter drive signal to the inverter 10 to control current to be supplied to the electric motor 1 according to the final torque command value; a vibration-suppression control information calculation unit 103 configured to calculate a vibration-suppression control gain and a vibration-suppression control limit value, for suppressing vibration of a drive system, which generates in a power train system; and a vibration-suppression control unit 104 configured to calculate a vibration-suppression control torque for suppressing vibration of the power train system according to a calculated vibration-suppression control information and motor rotation speed.

Figure 6:
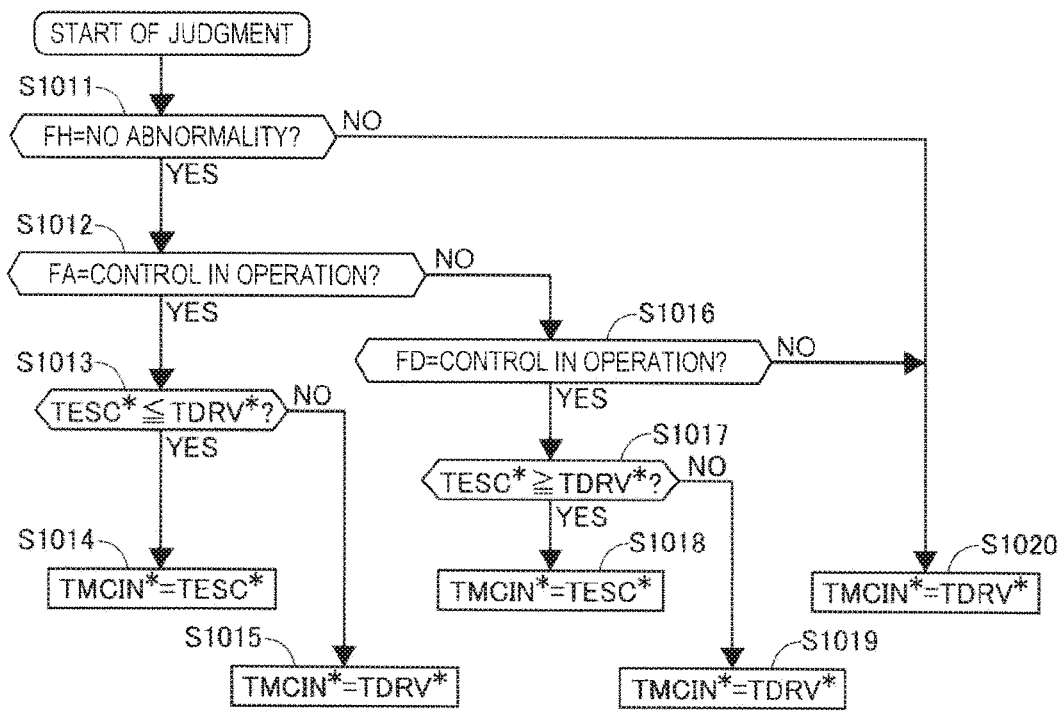
FIG. 6 is a flowchart showing a command value selection processing of the Embodiment 1.

FIG. 6 is a flowchart showing a command value selection processing of the Embodiment 1. The selector switch 101 carries out the following judgment processing, to thereby output either one of a driver's demand torque command value TDRV* and a slip control torque command value TESC* as the torque command value TMCIN*. In the brake controller 50, there are provided an acceleration slip control flag FA and a deceleration slip control flag FD, which indicate a slip control state in the traction control unit 51, and there is further provided an ESC state flag FH indicative of an abnormal state of the hydraulic unit 5 and the brake controller 50 themselves. Step S1011 makes a judgment as to whether the ESC state flag FH indicates "No abnormality". If "No abnormality" is indicated, the routine advances to Step S1012. If there is abnormality, the routine moves to Step S1020, which switches the torque command value TMCIN* to the driver's demand torque command value TDRV* without selecting the command from the brake controller 50.

Step S1012 makes a judgment as to whether the acceleration slip control flag FA indicates that the control is in operation. If the control is in operation, the routine proceeds to Step S1013. If the control is not in operation, the routine advances to Step S1016. Step S1013 makes a judgment as to whether the slip control torque command value TESC* is equal to or smaller than the driver's demand torque command value TDRV*. If the slip control torque command value TESC* is equal to or smaller than the driver's demand torque command value TDRV*, the routine moves to Step S1014, which switches the torque command value TMCIN* to the slip control torque command value TESC*. In other words, during the acceleration slip control, torque-down is supposed to be performed with respect to the driver's demand torque command value TDRV*. If the slip control torque command value TESC* is equal to or smaller than the driver's demand torque command value TDRV*, it is required to select a lower torque to suppress a slip. If the slip control torque command value TESC* is equal to or larger than the driver's demand torque command value TDRV*, despite that the acceleration slip control is in operation, this encourages an acceleration slip. If that happens, the routine proceeds to Step S1015, which switches the torque command value TMCIN* to the driver's demand torque command value TDRV*.

Step S1016 makes a judgment as to whether the deceleration slip control flag FD indicates that the control is in operation. If the control is in operation, the routine proceeds to Step S1017. If the control is not in operation, the routine moves to Step S1020. Step S1017 makes a judgment as to whether the slip control torque command value TESC* is equal to or larger than the driver's demand torque command value TDRV*. If the slip control torque command value TESC* is equal to or larger than the driver's demand torque command value TDRV*, the routine advances to Step S1018, which switches the torque command value TMCIN* to the slip control torque command value TESC*. To be more specific, during the deceleration slip control, the driver's demand torque command value TDRV* is selected, and a regenerative torque is generated, which causes a slip. To solve this slip, torque-up is performed. It is therefore considered that, if the slip control torque command value TESC* is equal to or larger than the driver's demand torque command value TDRV*, proper control is being carried out. In contrast, if the slip control torque command value TESC* is equal to or smaller than the driver's demand torque command value TDRV*, despite that the deceleration slip control is in operation, this encourages a deceleration slip. In this case, the routine moves to Step S1019, which switches the torque command value TMCIN* to the driver's demand torque command value TDRV*.

Figure 7:
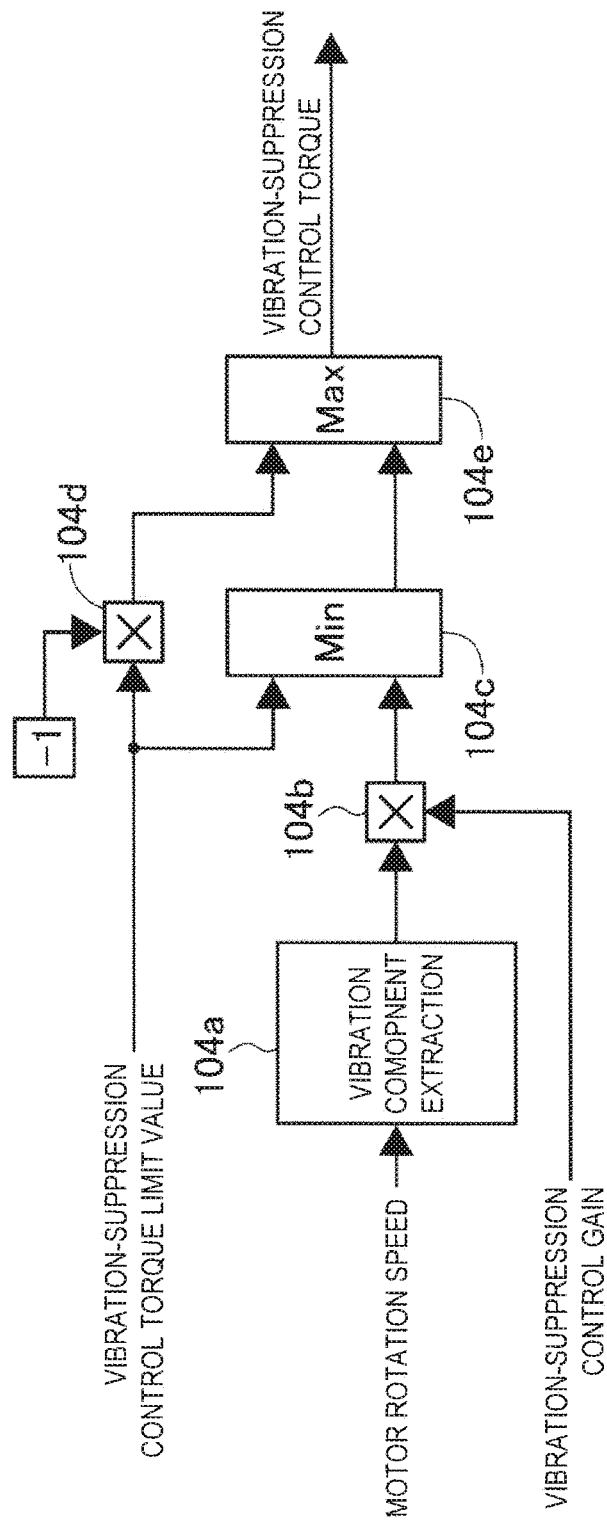
FIG. 7 is a control block diagram showing processing of calculating a vibration-suppression control torque command value according to the Embodiment 1.

FIG. 7 is a control block diagram showing processing of calculating a vibration-suppression control torque command value according to the Embodiment 1. The vibration-suppression control unit 104 includes a vibration component extraction unit 104a which extracts a vibration component from the motor rotation speed. The vibration component extraction unit 104a comprises a high-pass filter and passes predetermined high-frequency components only. A gain multiplication unit 104b multiplies a vibration control gain by vibration components which have passed through the high-pass filter. A torque limiting unit 104c compares the vibration-suppression control torque limit value with the vibration-suppression torque after the gain multiplication, and selects a smaller value. A negative value multiplication unit 104d multiplies the vibration-suppression control torque limit value by a negative value. A torque limiting unit 104e compares the negative value of the vibration-suppression control torque limit value with the vibration-suppression control torque after the gain multiplication, and selects a larger value. In this way, a vibration-suppression control torque according to the vibration component is computed, and an excessive vibration-suppression control torque is suppressed from generating.

(Slip Control)

Figure 8:
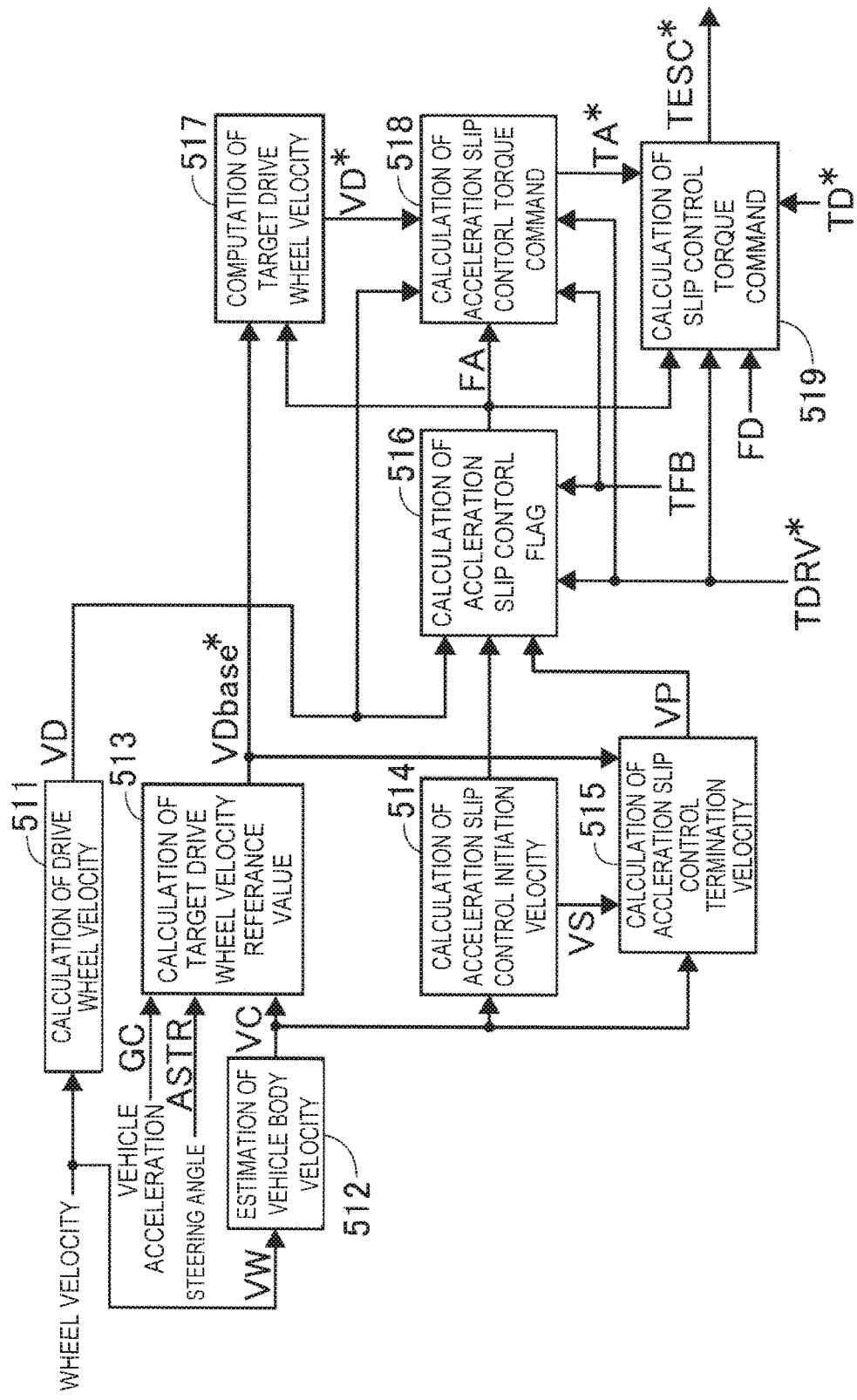
FIG. 8 is a control block diagram showing slip control which is implemented in a traction control unit according to the Embodiment 1.

FIG. 8 is a control block diagram showing the slip control which is implemented in the traction control unit according to the Embodiment 1. A drive wheel velocity calculation unit 511 calculates a drive wheel velocity from a detected wheel velocity VW. A vehicle body velocity estimation unit 512 computes an estimated vehicle body velocity VC from the wheel velocity VW. For example, the vehicle body velocity may be estimated from an average value of the vehicle body velocity, which is calculated from wheel velocities of the driven wheels, or may be an average value of vehicle body velocity, which is calculated from wheel velocities of four wheels, or may be selected by select low of the driven and drive wheels (a lower velocity between the driven wheel velocities and the drive wheel velocities is selected to obtain the vehicle body velocity) or the like. There is no particular limitation.

(Processing of Calculating a Target Drive Wheel Velocity Reference Value)

Figure 9:
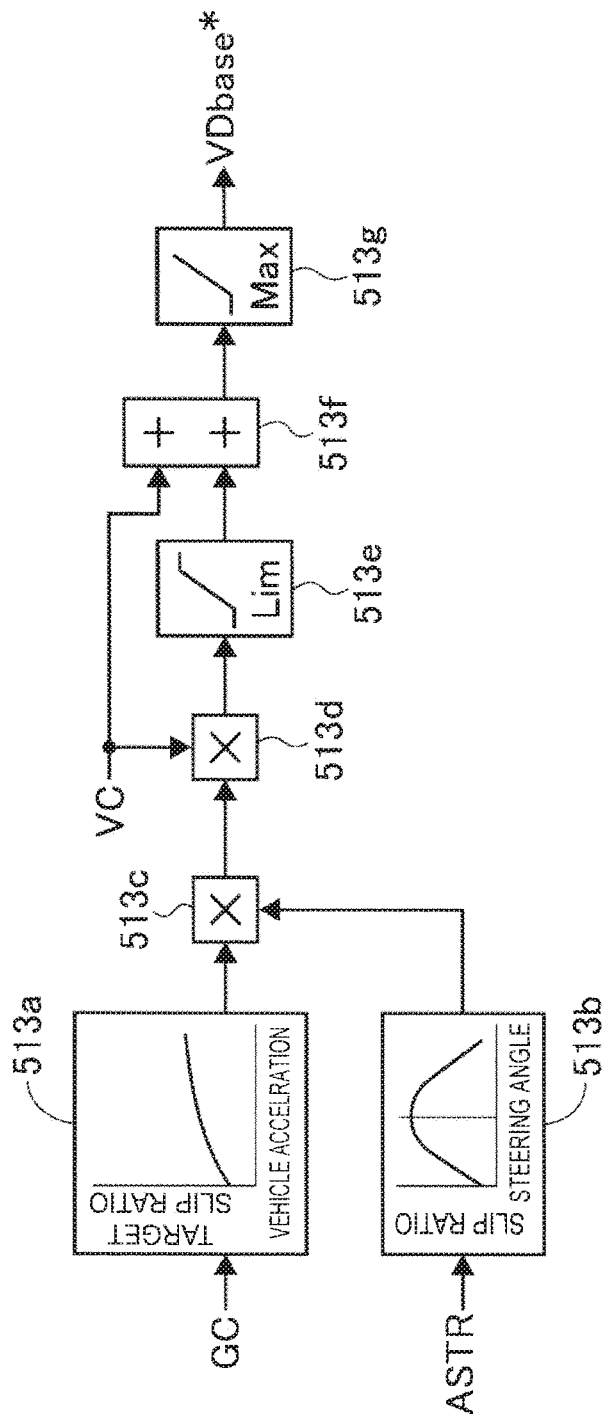
FIG. 9 is a control block diagram showing processing of calculating a target drive wheel velocity reference value according to the Embodiment 1.

A target drive wheel velocity reference value calculation unit 513 calculates a target drive wheel velocity reference value VDbase* which is target velocity of each drive wheel, from vehicle acceleration GC, steering angle Astr, and the estimated vehicle body velocity VC. FIG. 9 is a control block diagram showing the processing of calculating the target drive wheel velocity reference value according to the Embodiment 1. A unit 513a for calculating a target slip ratio gain for acceleration is provided with a map of the target slip ratio gain for acceleration. The map is so designed as to calculate a larger target slip ratio gain for acceleration as the detected acceleration GC increases. In other words, it is considered that, when a large acceleration is obtained, a frictional force is secured between the wheels and the road surface even if a certain degree of slip ratio is allowed. A unit 513b for calculating a target slip ratio gain for steering angle is provided with a map of the target slip ratio gain for steering angle. A large target slip ratio gain for steering angle is calculated when a detected steering angle is in the vicinity of a neutral position. A smaller target slip ratio gain for steering angle is calculated as the steering state indicated by the steering angle is large. More specifically, when moving in a rectilinear manner, the vehicle does not require much cornering force, so that force is used greatly in a longitudinal direction of a friction circle of the tires. When being steered, the vehicle requires the cornering force, so that force is not used greatly in the longitudinal direction of the friction circle of the tires, and a lateral force is secured.

A slip ratio calculation unit 513c multiplies the target slip ratio gain for acceleration by the target slip ratio gain for steering angle to calculate a target slip ratio reflecting the statuses of both the gains. A target slip amount calculation unit 513d multiplies the estimated vehicle body velocity VC by a calculated target slip ratio to calculate target slip amount. A limiter processing unit 513e subjects the target slip amount to limit processing to suppress a sudden change of a target value. An addition unit 513f adds the target slip amount to the estimated vehicle body velocity VC to calculate target drive wheel velocity VD*. A limiter processing unit 513g subjects the target drive wheel velocity VD* to the limiter processing to calculate the target drive wheel velocity reference value VDbase*. If there is provided a yaw rate sensor, it is possible to compare a yaw rate sensor value with an estimated yaw rate which is calculated from the steering angle and the estimated vehicle body velocity VC. If there is a large gap, it is possible to implement control so that the target slip ratio and the torque command value are corrected to suppress the gap between the yaw rate sensor value and the estimated yaw rate.

(Processing of Calculating Acceleration Slip Control Initiation Velocity)

Figure 13:
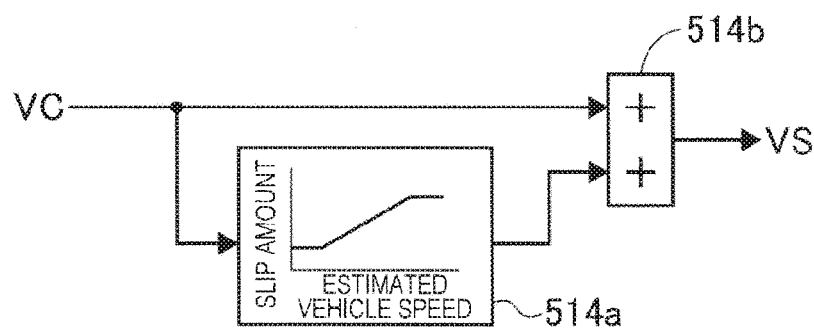
FIG. 13 is a control block diagram showing processing of calculating acceleration slip control initiation velocity according to the Embodiment 1.

A unit 514 for calculating acceleration slip control initiation velocity calculates control initiation velocity VS from the estimate vehicle body velocity VC. FIG. 13 is a control block diagram showing the processing of calculating the acceleration slip control initiation velocity according to the Embodiment 1. According to a slip amount map 514a for control initiation, a larger slip amount is calculated as the estimated vehicle body velocity VC increases. This way, the control initiation slip ratio is maintained virtually constant on a slip ratio basis. However, while the vehicle is moving at low speed as seen when the vehicle starts, it is difficult to calculate the slip ratio, so that the map 514a sets a certain slip amount. The addition unit 514b adds the slip amount, which is calculated from the slip amount map 514a for control initiation, to the estimated vehicle body velocity VC, to calculate the control initiation velocity VS.

(Processing of Calculating Acceleration Slip Control Termination Velocity)

Figure 14:
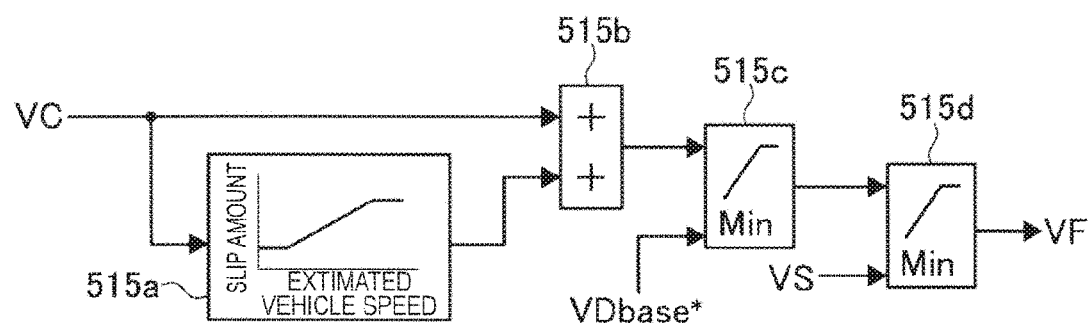
FIG. 14 is a control block diagram showing processing of calculating acceleration slip control termination velocity according to the Embodiment 1.

A unit 515 for calculating acceleration slip control termination velocity calculates control termination velocity VF from the estimated vehicle body velocity VC. FIG. 14 is a control block diagram showing the processing of calculating the acceleration slip control termination velocity according to the Embodiment 1. According to a slip amount map 515a for control termination, a larger slip amount is calculated as the estimated vehicle body velocity VC increases. When the control termination velocity VF is set, the slip amount which is set in the slip amount map 515a for control termination is set smaller than the slip amount which is set in the slip amount map 514a for control initiation in comparison by using the same estimated vehicle body velocities VC in order to avoid control hunting. The addition unit 515b then adds the slip amount, which is calculated from the slip amount map 515a for control termination, to the estimated vehicle body velocity VC to calculate a control termination velocity computation value. A first selection unit 515c selects a smaller value between the control termination velocity computation value and the target drive wheel velocity reference value VDbase* to set the control termination velocity VF further on the estimated vehicle body velocity VC side than the target drive wheel velocity reference value VDbase* and thus prevents hunting. Likewise, a second selection unit 515d selects a smaller value between the value selected by the first selection unit 515c and the control initiation velocity VS to set the control termination velocity VF further on the estimated vehicle body velocity VC side than the control initiation velocity VS and thus prevents hunting. The second selection unit 515d then outputs a value selected at the end as the control termination velocity VF.

(Processing of Calculating an Acceleration Slip Control Flag)

Figure 15:
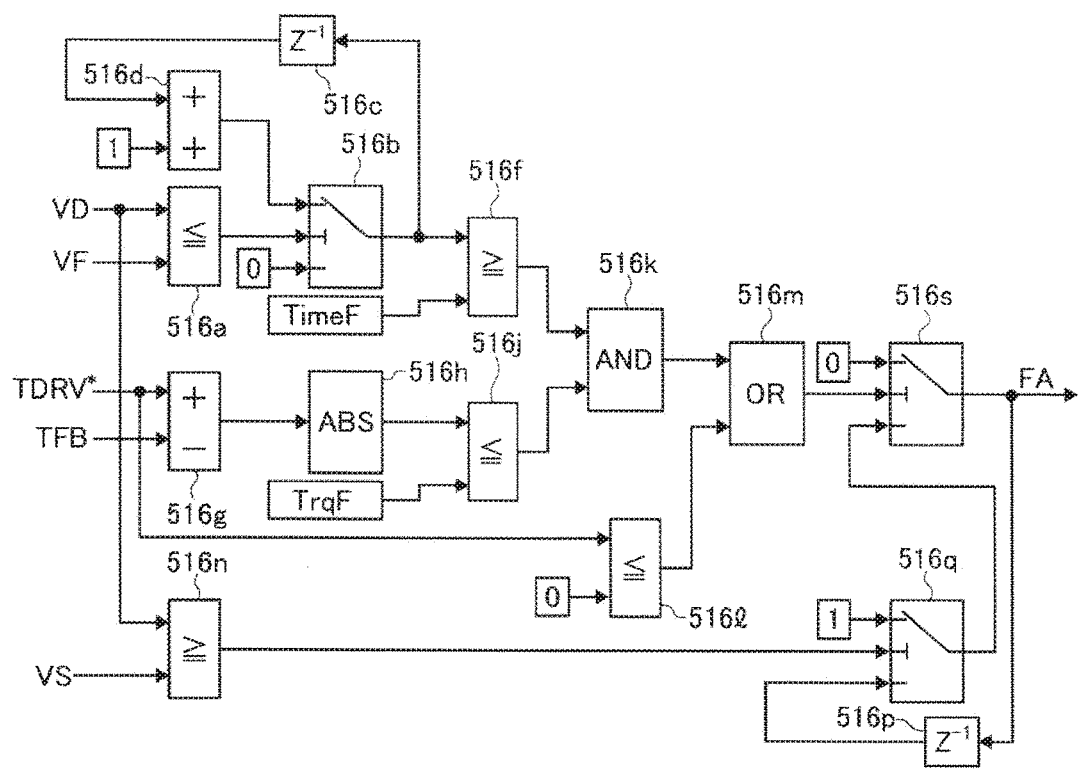
FIG. 15 is a control block diagram showing processing of calculating an acceleration slip control flag according to the Embodiment 1.

An acceleration slip control flag calculation unit 516 makes a judgment as to whether the acceleration slip control needs to be implemented according to a condition of the drive wheels. If the acceleration slip control is to be implemented, the acceleration slip control flag calculation unit 516 outputs the acceleration slip control flag FA indicating "ON". If not, the acceleration slip control flag calculation unit 516 outputs the acceleration slip control flag FA indicating "OFF". FIG. 15 is a control block diagram showing the processing of calculating the acceleration slip control flag according to the Embodiment 1. FIG. 15 shows a case in which a shift lever is in a "D" range. Even if the shift lever is in another range, similar processing is basically performed.

A control termination judgment unit 516a compares the drive wheel velocity VD with the control termination velocity VF. If the drive wheel velocity VD is equal to or lower than the control termination velocity VF, the control termination judgment unit 516a outputs a switch signal to a termination-side first switch 516b. The termination-side first switch 516b is a switch for switching between zero and a counter value formed of a previous value output unit 516c and a count-up unit 516d. When the termination-side first switch 516b receives a switch signal from the control termination judgment unit 516a while zero is selected during the drive slip control, the termination-side first switch 516b initiates count-up through the previous value output unit 516c and the count-up unit 516d and outputs the signal to a control termination delay judgment unit 516f. When the value outputted from the termination-side first switch 516b is equal to or larger than a predetermined timer value TimeF, the control termination delay judgment unit 516f outputs a signal to an AND condition judgment unit 516k, the signal indicating that one of conditions for control termination is satisfied. In other words, the control termination delay judgment unit 516f makes a judgment as to whether time which is equal to or longer than the TimeF has lapsed since the drive wheel velocity VD becomes equal to or lower than the control termination velocity VF. If the time which is equal to or longer than the TimeF has lapsed, the control termination delay judgment unit 516f outputs a signal indicating that one of the conditions for control termination is satisfied.

A torque deviation computation unit 516g calculates a torque deviation between the driver's demand torque command value TDRV* and a final torque command value TFB to the electric motor 1, and then outputs a value converted into an absolute value by an absolute value processing unit 516h to a torque condition judgment unit 516j. When the torque deviation is equal to or smaller than a predetermined torque value TrpF, the torque condition judgment unit 516j outputs a signal indicating that one of the conditions for control termination is satisfied.

When conditions for termination judgment and delay processing based on the drive wheel velocity VD are satisfied, and a condition that the driver's demand torque command value TDRV* is substantially the same as the torque commanded to the electric motor 1 is satisfied, the AND condition judgment unit 516*k* outputs a control termination condition satisfaction signal to an OR condition judgment unit 516*m*. When the driver's demand torque TRDV* is zero or lower, a negative value judgment unit 516*l* outputs the control termination condition satisfaction signal. When either one of the AND condition judgment unit 516*k* and the negative value judgment unit 516*l* outputs the control termination condition satisfaction signal, the OR condition judgment unit 516*m* outputs a switch signal to a control flag switch 516*s*.

The control initiation judgment unit 516*n* compares the drive wheel velocity VD with the control initiation velocity VS. If the drive wheel velocity VD is equal to or higher than the control initiation velocity VS, the control initiation judgment unit 516*n* outputs a switch signal to an initiation-side switch 516*q* to output "1". When the control initiation judgment is made, the slip of the drive wheels is increasing, and an immediate initiation of control is required. Slip control is therefore immediately initiated without setting a delay time or the like. The initiation-side switch 516*q* is inputted with a signal of a unit 516*p* for outputting a previous value of a control flag. The previous value is that of the control flag switch 516*s*. While "1" is being outputted according to the switch signal from the control initiation judgment unit 516*n*, if a condition of the control initiation judgment unit 516*n* becomes unsatisfied, "1" is switched to the previous value of the control flag. At this time, if the control termination condition satisfaction signal is not outputted from the OR condition judgment unit 516*m*, the control flag switch 516*s* continuously outputs "1". The control flag is therefore turned to ON.

(Processing of Calculating Target Drive Wheel Velocity)

Figure 10:
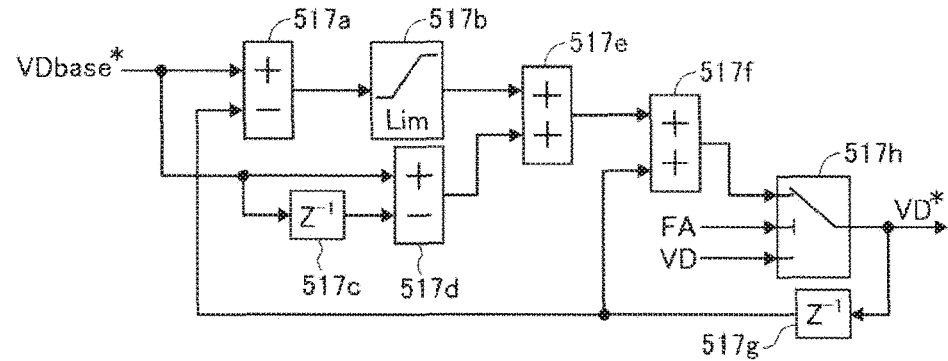
FIG. 10 is a control block diagram showing processing of calculating target drive wheel velocity according to the Embodiment 1.

A target drive wheel velocity calculation unit 517 calculates the target drive wheel velocity VD* from the target drive wheel velocity reference value VDbase*. FIG. 10 is a control block diagram showing the processing of calculating the target drive wheel velocity according to the Embodiment 1. Before the initiation of the slip control, the target drive wheel velocity VD* is set to the drive wheel velocity VD as an initial value. A target value deviation computation unit 517*a* computes a target value deviation between the target drive wheel velocity reference value VDbase* and a previous target drive wheel velocity VD* calculated by a unit 517*g* for calculating a previous value of target drive wheel velocity. To achieve a smooth torque change, a limiter 517*b* performs limiting processing for limiting the deviation and outputs a result to a first addition unit 517*e*. A change amount computation unit 517*d* calculates a change amount from difference between a previous target drive wheel velocity reference value VDbase* outputted from a previous value output unit 517*c* which outputs a previous value of the target drive wheel velocity reference value VDbase* and a current target drive wheel velocity reference value VDbase*, and then outputs the change amount to the first addition unit 517*e*.

The first addition unit 517*e* adds the target deviation value and the change amount of the target drive wheel velocity reference value VDbase* and calculates a change amount of the drive wheel velocity to be changed by the current control. This makes it possible for the target drive wheel velocity VD* to follow the target drive wheel velocity reference value VDbase* even if the target drive wheel velocity reference value VDbase* is changed to exceed the limit of the limiter 517*b* after the slip control is initiated. A second addition unit 517*f* adds a value outputted from the first addition unit 517*e* to the previous target drive wheel velocity VD* to calculate a primary target drive wheel velocity, and then outputs the primary target drive wheel velocity to a target drive wheel velocity selector switch 517*h*. When the acceleration slip control flag FA is zero, the target drive wheel velocity selector switch 517*h* outputs the drive wheel velocity VD as a final target drive wheel velocity VD*. When the acceleration slip control flag FA is "1", the target drive wheel velocity selector switch 517*h* outputs the primary target drive wheel velocity as the final target drive wheel velocity VD*.

(Processing of Calculating an Acceleration Slip Control Torque Command Value)

Figure 11:
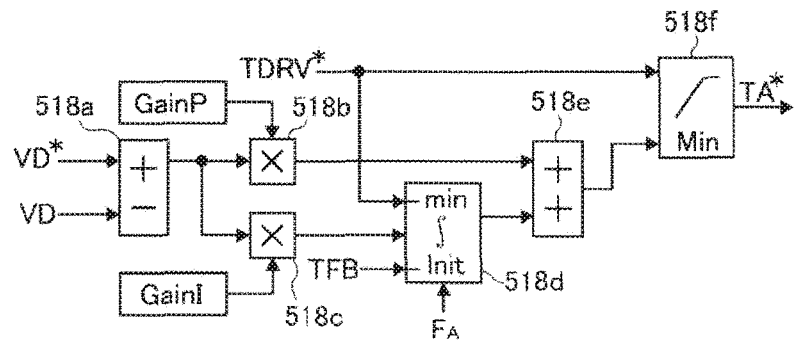
FIG. 11 is a control block diagram showing processing of calculating an acceleration slip control torque according to the Embodiment 1.

A unit 518 for calculating an acceleration slip control torque command value calculates an acceleration slip control torque command value from the deviation between the drive wheel velocity VD and the target drive wheel velocity VD*. FIG. 11 is a control block diagram showing the processing of calculating the acceleration slip control torque according to the Embodiment 1. A velocity deviation computation unit 518*a* computes a velocity deviation between the target drive wheel velocity VD* and the drive wheel velocity VD. A proportional gain multiplication unit 518*b* multiplies a proportional gain Kp by the velocity deviation and outputs a proportional component. An integration gain multiplication unit 518*c* multiplies an integration gain Ki by the velocity deviation. An integration unit 518*d* outputs as an integration component a smaller value between a value obtained by integrating the final torque command value TFB as an initial value and the driver's demand torque command value TDRV*. A PI control amount computation unit 518*e* adds the proportional component and the integration component and outputs a PI control torque command value. A unit 518*f* for determining an acceleration slip control torque command outputs as a final acceleration slip control torque command value TA* a smaller value between the driver's demand torque command value TDRV* and the P1 control torque command value. Since the initial value of the target drive wheel velocity VD* is the drive wheel velocity VD, the proportional component is zero, and the integration component is the final torque command value TFB. For that reason, there is no deviation immediately after the control is initiated, so that torque variation does not occur.

(Processing of Calculating a Slip Control Torque Command Value)

Figure 12:
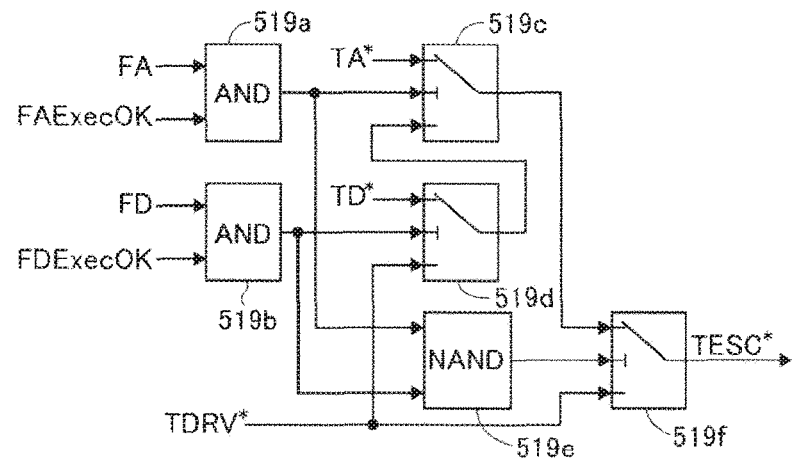
FIG. 12 is a control block diagram showing processing of calculating a slip control torque command value according to the Embodiment 1.

A unit 519 for calculating a slip control torque command value selects either one of a slip control torque command value TA* and the driver's demand torque command value TDRV* on the basis of the signals of the acceleration slip control flag FA, the deceleration slip control flag FD, and the like, and outputs a final slip control torque command value TESC*. FIG. 12 is a control block diagram showing the processing of calculating the slip control torque command value according to the Embodiment 1. An acceleration slip control implementation permission flag FAExecOK and a deceleration slip control implementation permission flag FDExecOK are each an implementation permission flag for the slip control. While regeneration is inhibited, when the slip control OFF switch is pushed, or when abnormality (abnormality in the wheel velocity sensor, for example) is detected, the implementation is inhibited. Other than these cases, the implementation is permitted. When the acceleration slip control flag FA and the acceleration slip control implementation permission flag FAExecOK both satisfy conditions, an acceleration-side AND judgment unit 519a outputs a switch signal to an acceleration slip control torque command value selector switch 519c and a NAND judgment unit 519e. Likewise, when the deceleration slip control flag FD and the deceleration slip control implementation permission flag FDExecOK both satisfy conditions, a deceleration-side AND judgment unit 519b outputs a switch signal to a deceleration slip control torque command value selector switch 519d and the NAND judgment unit 519e. The NAND judgment unit 519e determines that there is abnormality when the acceleration slip control flag FA and the deceleration slip control flag FD both satisfy the conditions at the same time. In such a case, the NAND judgment unit 519e outputs the driver's demand torque command value TDRV* instead of following the slip control demand.

When an acceleration slip control demand is outputted from the acceleration-side AND judgment unit 519a, the first torque command value selector switch 519c switches from the signal (TD* or TDRV*) outputted from the second torque command value selector switch 519d to an acceleration slip control torque command value TA*, and outputs the TA* to a unit 519f for calculating a slip control torque command value. If the acceleration slip control demand is not outputted, the first torque command value selector switch 519c outputs the signal outputted from the second torque command value selector switch 519d. When a deceleration slip control demand is outputted from the deceleration-side AND judgment unit 519b, the second torque command value selector switch 519d switches from the driver's demand torque command value TDRV* to the deceleration slip control torque command value TD*, and outputs the TD* to the first torque command value selector switch 519c. If the deceleration slip control demand is not outputted, the second torque command value selector switch 519d outputs the driver's demand torque command value TDRV* to the first torque command value selector switch 519c. If a NAND judgment unit 510e determines that there is abnormality, the unit 519f for calculating a slip control torque command value outputs the driver's demand torque command value TDRV* as the slip control torque command value TESC*. If there is no abnormality, the unit 519f outputs as the slip control torque command value TESC* the signal outputted from the first torque command value selector switch 519c.

(Operation by Slip Control Improved in Response)

Figure 16:
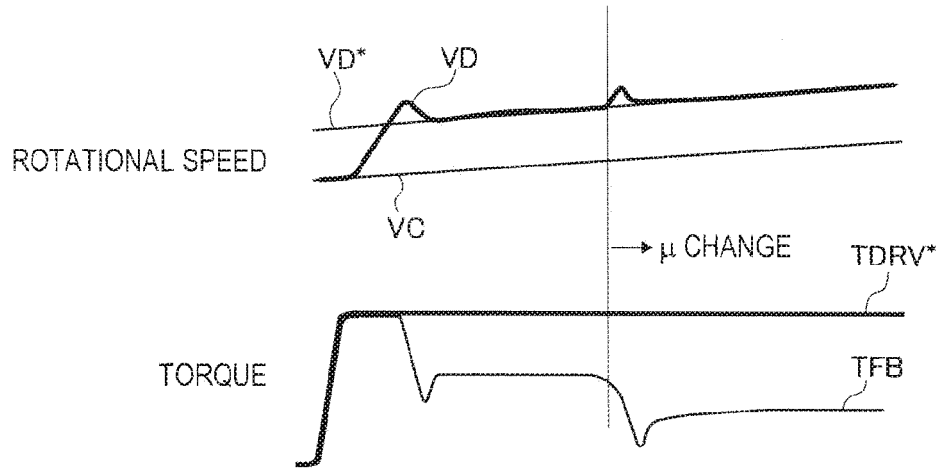
FIG. 16 is a timeline chart showing relationship between rotational speed and torque when drive slip control is implemented.
Figure 16:
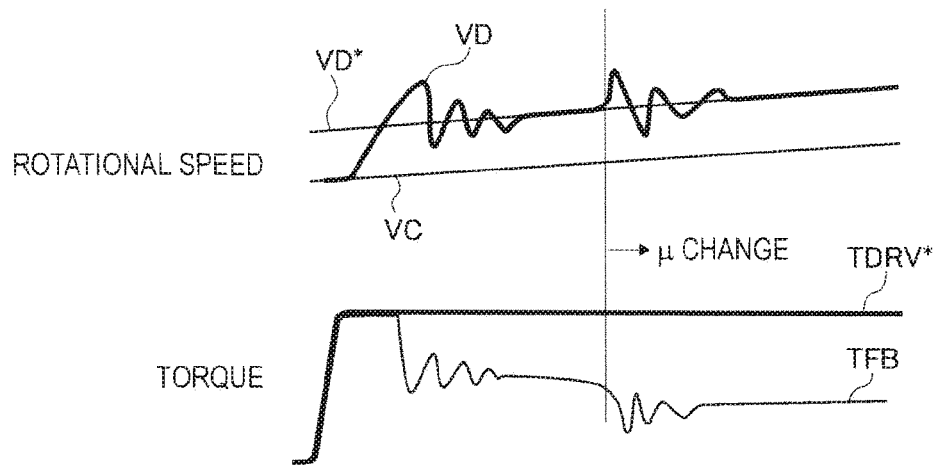
Figure 16:
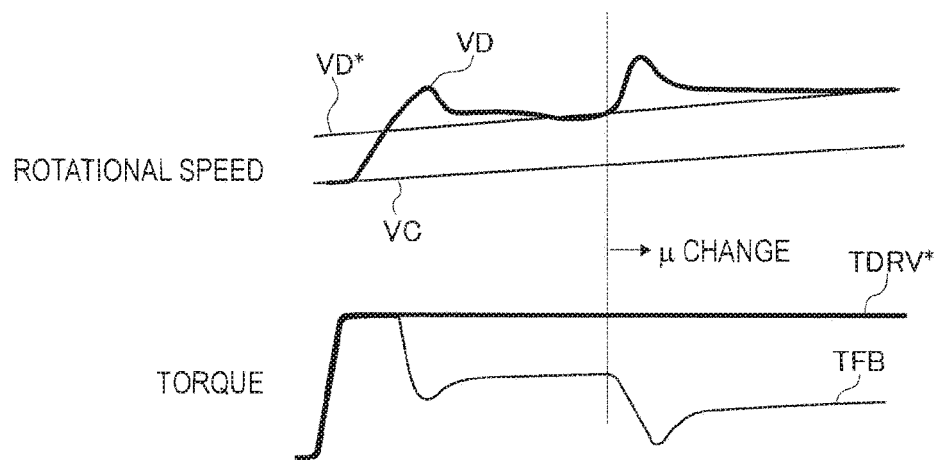

The following descriptions are about operation at the time of slip control, which is obtained by the above-described control structure. FIG. 16 is a timeline chart showing relationship between rotational speed and torque when the drive slip control is implemented. FIG. 16(a) shows a case in which a structure of the Embodiment 1 is employed. FIG. 16(b) shows a case in which a structure of the comparative example shown in FIG. 3 is employed, and the control gain is set high. FIG. 16(c) shows a case in which the structure of the comparative example shown in FIG. 3 is employed, and the control gain is set low. As illustrated in FIG. 16(a), if the drive slip occurs when the driver's demand torque command value TDRV* is outputted, the acceleration slip control flag FA becomes "1", and the acceleration slip control torque command value TA* is outputted so that the drive wheel velocity VD converges to the target drive wheel velocity VD*. At this time, according to the structure of the Embodiment 1, the acceleration slip control torque command value TA* is outputted from the traction control unit 51 of the brake controller 50 directly to the motor controller 100 without the vehicle controller 110. For this reason, there is no delay in response, and the drive wheel velocity VD successfully converges to the target drive wheel velocity VD*. Even if there is a μ change as seen in a case where the vehicle suddenly comes to a frozen road during driving, and a road friction factor is rapidly decreased, traction control with extremely high convergence is accomplished due to a good response. A significant point is that the good convergence makes it possible to secure a cornering force.

In contrast, according to the comparative example illustrated in FIG. 16(b), if the traction control is initiated after the drive wheel velocity VD exceeds the target drive wheel velocity VD*, a large overshoot takes place, attributable to a response delay. Even if motor torque is reduced for the convergence of the rotational speed which has overshot, this makes the traction control vibrational, and it takes time before the convergence is accomplished. Also, the traction control becomes vibrational when the μ change occurs, resulting in a poor convergence. To solve the problem in FIG. 16(b), it is one idea to set a control gain low to suppress the vibrational motion as illustrated in FIG. 16(c). In this case, although the vibrational motion of the control can be suppressed, it takes time before the drive wheel velocity VD converges to the target drive wheel velocity VD*. The slip amount remains large until the convergence is achieved. It is thus impossible to transmit a sufficient traction between the tires and the road surface. Furthermore, the cornering force is slightly decreased, and vehicle stability is not sufficient. If the command is given directly to the motor controller 100 as in the Embodiment 1, this makes a fairly large difference in convergence. This advantage of the present invention gives the driver a feeling of stability when the driver actually drives the vehicle of the Embodiment 1 on a frozen road or the like. This stability has never been experienced and is greater than the one that can be expected from a desk plan.

(Judgment of Validity of a Torque Command in the Motor Controller)

Consideration will be now given to validity in a case where the driver's demand torque command value TDRV* and the slip control torque command value TESC* are switched according to the control flag in the motor controller 100. Regarding the electric vehicle of the Embodiment 1, along with optimization of a transmission path of a torque command, validation is required as to whether the torque command employed by the motor controller 100 is proper for the vehicle controller 110.

The conventional art simply makes a comparison between the torque command value calculated in the vehicle controller 110 and the torque which is fed back by the motor controller 100 since the torque command is outputted only from the vehicle controller 110. However, the comparison alone causes an incorrect abnormality judgment. This is because, if a torque command value different from that of the vehicle controller 110 is outputted from the brake controller 50 to the motor controller 100 as in the Embodiment 1, the motor controller 100 feeds back the value which complies with the command of the brake controller 50 to the vehicle controller 110. To solve this, the vehicle controller 110 is provided with a control-system abnormality judgment unit 110a configured to perform a new control-system abnormality judgment processing, to thereby judge the validity of the control which is currently carried out, and thus improve the reliability of the control.

Figure 17:
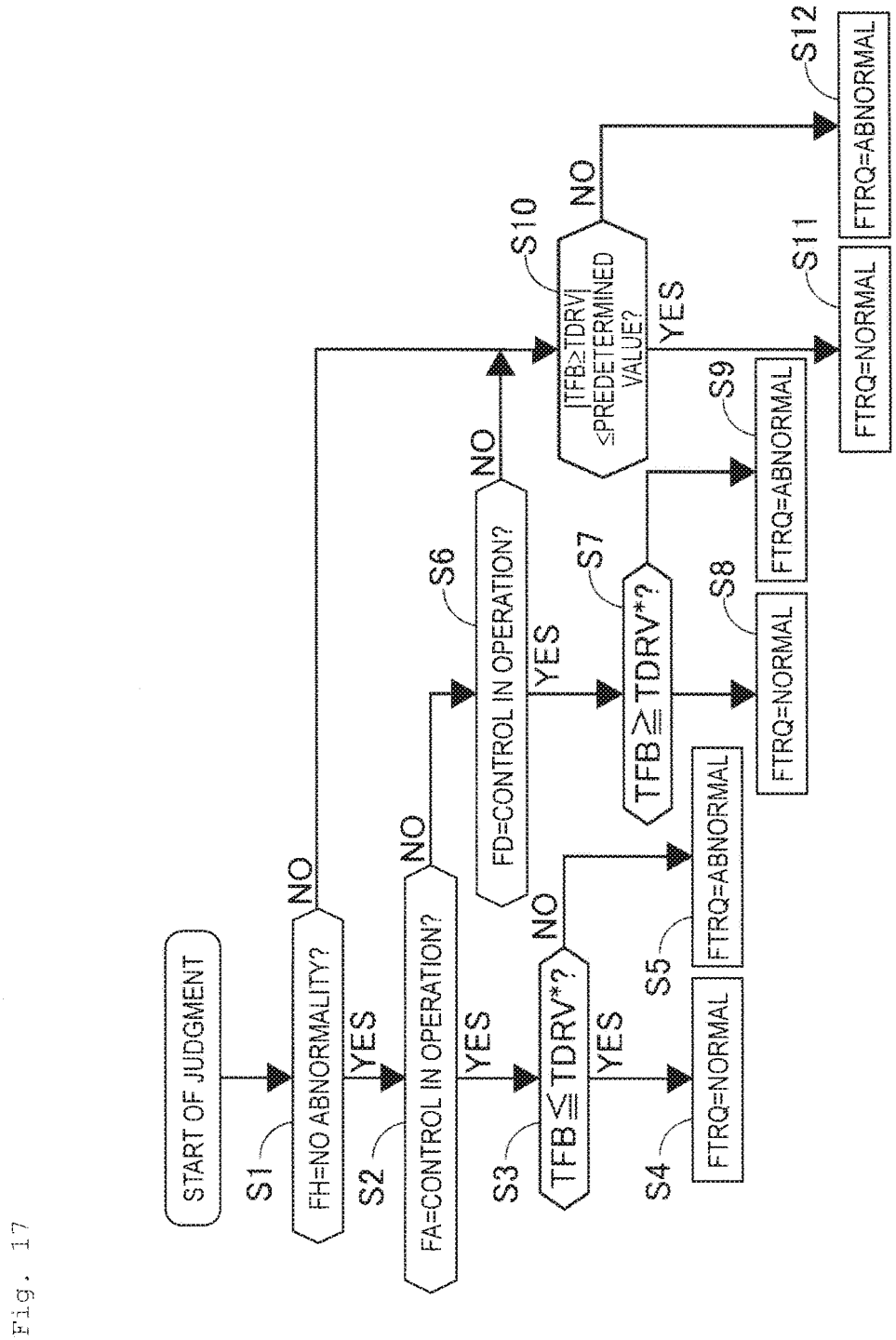
FIG. 17 is a flowchart showing processing of a control system abnormality judgment according to the Embodiment 1.
Figure 18:
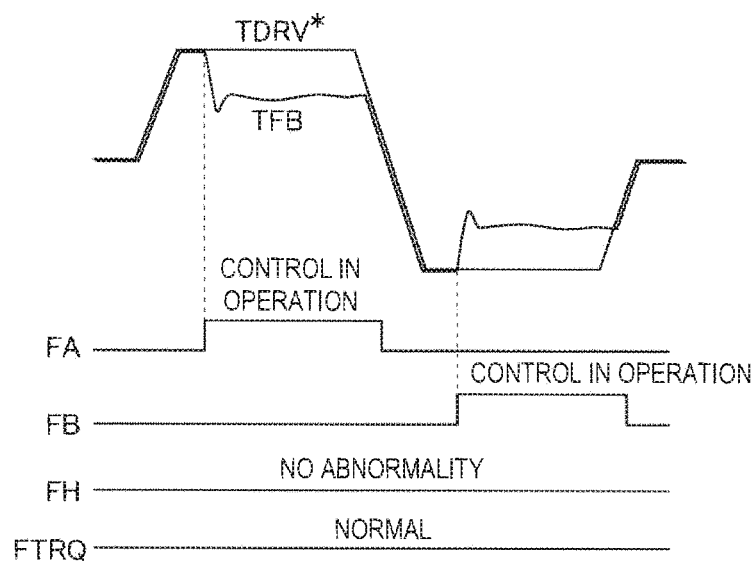
FIG. 18 is a timeline chart during slip control according to the Embodiment 1.

FIG. 17 is a flowchart showing the processing of abnormality judgment of the control system according to the Embodiment 1. Step S1 makes a judgment as to whether the ESC state flag FH indicates "No abnormality". If "No abnormality" is indicated, the routine moves to Step S2. If there is abnormality, the routine advances to Step S10. Step S2 makes a judgment as to whether the acceleration slip control flag FA indicates that control is in operation. If the control is in operation, the routine proceeds to Step S3. If the control is not in operation, the routine advances to Step S6. Step S3 makes a judgment as to whether the final torque command value TFB is equal to or smaller than the driver's demand torque command value TDRV*. If the final torque command value TFB is equal to or smaller than the driver's demand torque command value TDRV*, the routine proceeds to Step S4, which sets a flag FTRQ indicative of a torque control state to "Normal". FIG. 18 is a timeline chart during the slip control according to the Embodiment 1. In an area of FIG. 18 where the acceleration slip control flag FA indicates that the control is in operation, torque-down is supposed to be carried out with respect to the driver's demand torque command value TDRV* during the acceleration slip control. If the final torque command value TFB is equal to or smaller than the driver's demand torque command value TDRV*, it is considered that proper control is being carried out. In contrast, if the final torque command value TFB is larger than the driver's demand torque command value TDRV*, despite that the acceleration slip control is in operation, this encourages the acceleration slip. In this case, the routine advances to Step S5, which sets the flag FTRQ to "Abnormal".

Step S6 makes a judgment as to whether the deceleration slip control flag FD indicates that control is in operation. If the control is in operation, the routine moves to Step S7, If not, the routine proceeds to Step S10. Step 7 makes a judgment as to whether the final torque command value TFB is equal to or larger than the driver's demand torque command value TDRV*. If the final torque command value TFB is equal to or larger than the driver's demand torque command value TDRV*, the routine advances to Step S8, which sets the flag FTQR indicative of the torque control state to "Normal". In an area of FIG. 18 where the deceleration slip control flag FD indicates that control is in operation, during the deceleration slip control, a slip occurs when a regenerative torque is generated as the driver's demand torque command value TDRV*. Since torque-up is performed to eliminate the slip, it is considered that proper control is being carried out if the final torque command value TFB is equal to or larger than the driver's demand torque command value TDRV*. If the final torque command value TFB is smaller than the driver's demand torque command value TDRV*, despite that the deceleration slip control is in operation, this encourages the deceleration slip. In this case, the routine moves to Step S9, which sets the flag FTRQ to "Abnormal".

Step S10 makes a judgment as to whether an absolute value of difference between the final torque command value TFB and the driver's demand torque command value TDRV* is equal to or smaller than a predetermined value. If the absolute value is equal to or smaller than the predetermined value, the absolute value is equal to or smaller than an error caused by a communication timing gap. The flag FTQR is then set to "Normal". If the absolute value of the difference is larger than the predetermined value, it cannot be said that the control corresponds to control carried out by the vehicle controller 110, and it is determined that the control is carried out by the brake controller 50 in which abnormality has occurred. The flag FTQR is then set to "Abnormal". A misjudgment can be avoided by taking into account the state and demand of the brake controller 50 with respect to the judgment made by the motor controller 100.

Advantages of Embodiment 1

Operation and advantages provided by the electric vehicle control system according to the Embodiment 1 will be listed below.

(1) There is provided the electric vehicle control system comprising the wheel velocity sensor 9 (wheel velocity calculation unit) configured to calculate the velocities of the wheels; the electric motor 1 configured to generate a driving/braking force on the wheels; the hydraulic unit 5 (hydraulic braking device) configured to generate a hydraulic braking force on the wheels; the motor controller 100 configured to control the electric motor 1 according to the command value; the brake controller 50 (hydraulic controller) configured to calculate the braking force to be generated on the wheels by using the calculated wheel velocities and control the fluid pressure of the hydraulic unit 5 so as to generate the calculated braking force; the vehicle controller 110 configured to calculate the driver's demand torque command value TDRV* (driver's demand torque command value) according to the driver's accelerating or braking operation; the first CAN bus CANT (first communication device) capable of communicating between the brake controller 50 and the motor controller 100; and the second CAN bus CAN2 (second communication device) capable of communicating between the vehicle controller 110 and the motor controller 100, wherein the brake controller 50 calculates the slip control torque command value TESC* (motor torque command value) from the calculated wheel velocities as the command value for generating the driving/braking force in the electric motor 1; the brake controller 50 transmits the slip control torque command value TESC* to the motor controller 100 through the first CAN bus CAN1; the vehicle controller 110 transmits the driver's demand torque command value TDRV* to the motor controller 100 through the second CAN bus CAN2; the motor controller 100 includes the selector switch 101 (control system) configured to select either one of the received slip control torque command value TESC* or the received driver's demand torque command value TDRV* as the command value. This makes it possible to transmit the slip control torque command value TESC* of the brake controller 50 directly to the motor controller 100 and therefore secure good response and slip stopping property with respect to changes in the road surface condition.

(2) Provided is the electric vehicle control system according to the system described in (1), wherein the motor controller 100 transmits the information about the selected command value to the vehicle controller 110 through the first CAN bus CAN1. The vehicle controller 110 is capable of recognizing the state of the control carried out by the motor controller 100, which makes it possible to secure the safety of the vehicle.

(3) Provided is the electric vehicle control system according to the system described in (2), wherein the vehicle controller 110 includes the control system abnormality judgment unit 110a configured to judge the abnormality of the control system on the basis of the received torque command value TESC* (selected command value), the acceleration slip control flag FA, the deceleration slip control flag FD and the ESC state flag FH (control state of the vehicle), and the driver's demand torque command value TDRV*. This makes it possible to perform the system abnormality judgment by the vehicle controller 110 and therefore enhance the reliability of the system.

(4) Provided is the electric vehicle control system according to the system described in (3), the control system abnormality judgment unit 110a includes the ESC state flag FH (hydraulic braking device abnormality judgment unit) configured to make a judgment as to whether the hydraulic unit 5 is abnormal as the control state of the vehicle; and the acceleration slip control flag FA (acceleration slip control state judgment unit) configured to make a judgment as to whether the acceleration slip control is in operation and the deceleration slip control flag FD (deceleration slip control state judgment unit) configured to make a judgment as to whether the deceleration slip control is in operation, as the control state of the vehicle. This makes it possible to recognize a proper system condition according to the control state of the hydraulic unit 5 and the brake controller 50, and therefore enhance the reliability of the system.

(5) Provided is the electric vehicle control system according to the system described in (4), wherein the control system abnormality judgment unit 110a determines that there is abnormality if the judged state of the hydraulic unit 5 is normal, and the driver's demand torque command value TDRV* is smaller than the selected command value during the acceleration slip control. When the final torque command value TFB is equal to or larger than the driver's demand torque command value TDRV*, despite that the acceleration slip control is in operation, this encourages the acceleration slip. In this situation, the routine moves to Step S5, which sets the flag FTRQ to "Abnormal", to thereby avoid an excessive slip.

(6) Provided is the electric vehicle control system according to the system described in (4), wherein the control system abnormality judgment unit 110a determines that there is abnormality if the judged state of the hydraulic unit 5 is normal, and the driver's demand torque command value TDRV* is equal to or larger than the final torque command value TFB during the deceleration slip control. When the driver's demand torque command value TDRV* is equal to or larger than the final torque command value TFB, despite that the deceleration slip control is in operation, this encourages the deceleration slip. In this situation, the routine moves to Step S9, which sets the flag FTRQ to "Abnormal", to thereby avoid an excessive slip.

(7) Provided is the electric vehicle control system according to the system described in (4), wherein the control system abnormality judgment unit 110a determines that there is abnormality when the difference between the drivers demand torque command value TDRV* and the final torque command value TFB (selected command value) is equal to or larger than the predetermined value if the judged state of the hydraulic unit 5 is normal, and neither the acceleration slip control nor the deceleration slip control is in operation, or if the judged state of the hydraulic unit 5 is abnormal. When the difference is equal to or larger than the predetermined value, it cannot be said that the control corresponds to control carried out by the vehicle controller 110, and there is the possibility that the control is carried out by the brake controller 50 in which abnormality has occurred. For that reason, the misjudgment of the motor controller 100 can be avoided by determining that there is abnormality.

(8) Provided is the electric vehicle control system according to the system described in (1), wherein the first CAN bus CAN1 (first communication device) and the second CAN bus CAN2 (second communication device) are CAN communication.

This makes it possible to construct the inexpensive and stable system by using existing communication devices, instead of designing a new communication device.

(9) Provided is the electric vehicle control system according to the system described in (8), wherein the CAN communication includes the first CAN bus CAN1, the second CAN bus CAN2 arranged in parallel to the first CAN bus CAN1, and the connection bus CAN3 connecting the first CAN bus CAN1 and the second CAN bus CAN2; the vehicle controller 110 is interposed in the connection bus CAN3; and the motor controller 100 and the brake controller 50 are connected to the first CAN bus CAN1. This makes it possible to transmit data from the brake controller 50 directly to the motor controller 100 without the vehicle controller 110, and therefore enhance the response of the control system.

(10) Provided is the electric vehicle control system according to the system described in (9), including the power steering controller 20 (electric power steering device) and the meter controller 22 (velocity meter control device), wherein the first CAN bus CAN1 is connected to the inverter 10 (component) for driving the electric motor 1; wherein the second CAN bus CAN2 is connected to the power steering controller 20 and the meter controller 22; the brake controller 50 delivers the information about the calculated wheel velocities to the first CAN bus CAN1; and the power steering controller 20 and the meter controller 22 receive the delivered information about the wheel velocities from the second CAN bus CAN2 via the vehicle controller 110. Since the vehicle controller 110 is interposed in the connection bus CAN3 between the first CAN bus CAN1 and the second CAN bus CAN2, the vehicle controller 110 is capable of recognizing the whole communication state. The information about the wheel velocities, which is required by the power steering controller 20 and the meter controller 22, is exclusively or mainly about vehicle speed. Unlike wheel velocities, vehicle speed does not suddenly change. Consequently, there is no problem even if a delay is caused in data transmission due to the interposition of the vehicle controller 110.

(11) Provided is the electric vehicle control system comprising the vehicle controller 110 configured to calculate the driver's demand torque command value TDRV* (driver's demand torque command value) according to the driver's accelerating or braking operation; the motor controller 100 configured to control the electric motor 1 which generates the driving/braking force on the wheels according to the command value; and the brake controller 50 (actuator controller) configured to calculate the slip control torque command value TESC* (vehicle demand torque command value) according to vehicle behavior, and control the hydraulic unit 5 (actuator) installed in the vehicle, wherein the motor controller 100 controls the electric motor 1 according to the driver's demand torque command value TDRV* from the vehicle controller 110 and the slip control torque command value TESC* from the brake controller 50. This makes it possible to transmit the slip control torque command value TESC* of the brake controller 50 directly to the motor controller 100, and therefore secure good response and slip stopping property with respect to changes in the road surface condition. The Embodiment 1 has been described taking the hydraulic unit 5 as an example of the actuator. However, the actuator is not limited to the hydraulic unit 5, and the system may be configured so that the torque command value is transmitted and received between actuators such as a four-wheel steering mechanism, a variable rudder angle mechanism for providing an auxiliary rudder angle, and a damping force variable mechanism which performs damping-force control.

(12) Provided is the electric vehicle control system according to the system described in (11), comprising the wheel velocity sensor 9 (wheel velocity calculation unit) configured to calculate the velocities of the wheels; and the hydraulic unit 5 (hydraulic braking device) configured to generate the hydraulic braking force on the wheels as the actuator, wherein an actuator controller is the brake controller 50 (hydraulic controller) configured to calculate the braking force to be generated on the wheels by using the calculated wheel velocities and control the hydraulic unit 5 so as to generate the calculated braking force. The employment of the brake controller 50 which acts in the longitudinal direction of the drive wheels makes it possible to implement the control system of the power train with higher response.

(13) Provided is the electric vehicle control system according to the system described in (12), comprising the first CAN bus CAN1 (first communication device) connecting the brake controller 50 and the motor controller 100 to each other, and the second CAN bus CAN2 (second communication device) connecting the vehicle controller 110 and the motor controller 100 to each other, wherein the brake controller 50 calculates the slip control torque command value TESC* (motor torque command value) as the command value for generating the driving/braking force in the electric motor 1 according to the calculated wheel velocities; the brake controller 50 transmits the slip control torque command value TESC* to the motor controller 100 through the first CAN bus CAN1; the vehicle controller 110 transmits the driver's demand torque command value TDRV* to the motor controller 100 through the second CAN bus CAN2; and the motor controller 100 selects either one of the received slip control torque command value TESC* and the received driver's demand torque command value TDRV* as the command value for generating the driving/braking force in the electric motor 1. This makes it possible to transmit the driver's demand torque command value TDRV* of the vehicle controller 110 and the slip control torque command value TESC* of the brake controller 50 directly to the motor controller 100, and therefore enhance the response of the control system.

(14) Provided is the electric vehicle control system according to the system described in (13), wherein the motor controller 100 transmits the information about the selected command value to the vehicle controller 110 through the first CAN bus CANT. The vehicle controller 110 is capable of recognizing the state of the control carried out by the motor controller 100, which makes it possible to secure the safety of the vehicle.

(15) Provided is the electric vehicle control system according to the system described in (11), wherein the vehicle controller 110 includes the control system abnormality judgment unit 110a configured to judge the abnormality of the control system on the basis of the received torque command value TESC* (selected command value), the acceleration slip control flag FA, the deceleration slip control flag FD and the ESC state flag FH (control state of the vehicle), and the driver's demand torque command value TDRV*. This makes it possible to perform the system abnormality judgment by the vehicle controller 110 and therefore enhance the reliability of the system.

(16) Provided is the electric vehicle control system comprising the wheel velocity sensor 9 (wheel velocity calculation unit) configured to calculate the velocities of the wheels; the electric motor 1 configured to generate the driving/braking force on the wheels; the hydraulic unit 5 (hydraulic braking device) configured to generate the hydraulic braking force on the wheels; the motor controller 100 configured to control the electric motor 1 according to the command value; the brake controller 50 (hydraulic controller) configured to calculate the braking force to be generated on the wheels by using the calculated wheel velocities, and control the hydraulic unit 5 so as to generate the calculated braking force; the vehicle controller 110 configured to calculate the driver's demand torque command value TDRV* according to the driver's accelerating or braking operation; and the CAN communication wires configured to connect the brake controller 50 to the motor controller 100 and the vehicle controller 110, the electric vehicle control system being provided with the control system in which the brake controller 50 calculates the slip control torque command value TESC* (motor torque command value) as a command value for generating the driving/braking force in the electric motor 1 according to the calculated wheel velocities; the brake controller 50 transmits the slip control torque command value TESC* to the motor controller 100 through the first CAN bus CAN1 (CAN communication wire); the vehicle controller 110 transmits the driver's demand torque command value TDRV* to the motor controller 100 through the connection bus CAN3 and the first CAN bus CAN1; and the motor controller 100 selects either one of the received slip control torque command value TESC* and the driver's demand torque command value TDRV* as the command value for generating the driving/braking force in the electric motor 1. This makes it possible to transmit the slip control torque command value TESC* of the brake controller 50 directly to the motor controller 100 and secure good response and slip stopping property with respect to changes in the road surface condition.

(17) Provided is the electric vehicle control system according to the system described in (16), wherein the motor controller 100 transmits the information about the selected command value to the vehicle controller 110 through the CAN communication wire. The vehicle controller 110 is capable of recognizing the state of the control carried out by the motor controller 100, which makes it possible to secure the safety of the vehicle.

(18) Provided is the electric vehicle control system according to the system described in (17), wherein the vehicle controller 110 includes the control system abnormality judgment unit 110a configured to judge the abnormality of the control system on the basis of the received torque command value TESC* (selected command value), the acceleration slip control flag FA, the deceleration slip control flag FD and the ESC state flag FH (control state of the vehicle), and the driver's demand torque command value TDRV*. This makes it possible to perform the system abnormality judgment by the vehicle controller 110 and therefore enhance the reliability of the system.

Embodiment 2

Figure 19:
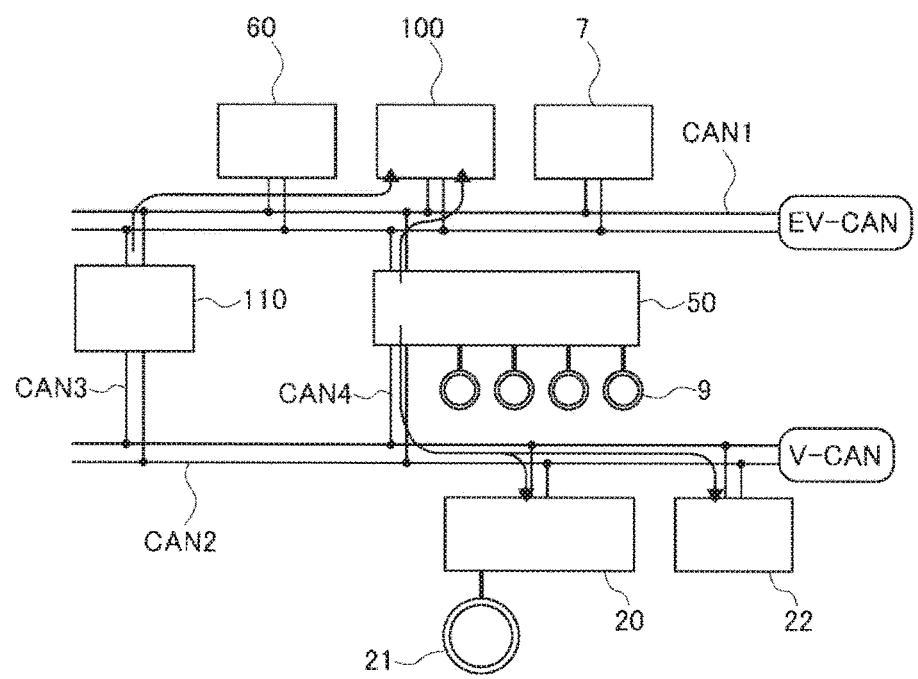
FIG. 19 is a schematic view showing connection of various controllers according to an Embodiment 2.

An Embodiment 2 will be now described. As the Embodiment 2 has a basic structure identical to that of the Embodiment 1, the following descriptions refer only to differences between these two embodiments. FIG. 19 is a schematic view showing connection of various controllers according to the Embodiment 2. In an electric vehicle of the Embodiment 2, the battery controller 60, the motor controller 100, and the inverter 10, configured to control the torque condition which effects between the drive wheels and a road surface, are connected to the first CAN bus CAN1 as a power train system. A chassis system including the power steering controller 20 and the meter controller 22 is connected to the second CAN bus CAN2.

The first CAN bus CAN1 and the second CAN bus CAN2 are connected to each other by the first connection bus CAN3 and a second connection bus CAN4. The first connection bus CAN3 is provided with the vehicle controller 110. Information transmitted and received through the first CAN bus CAN1 is received by the vehicle controller 110 interposed in the first connection bus CAN3 and then outputted to the second CAN bus CAN2. Likewise, information transmitted and received through the second CAN bus CAN2 is received by the vehicle controller 110 interposed in the connection bus CAN3 and then outputted to the first CAN bus CAN1. The second connection bus CAN4 is provided with the brake controller 50. Information about wheel velocities, the slip control torque command value TESC* and the like, which are detected by the brake controller 50, are outputted directly to the first CAN bus CAN1 and the second CAN bus CAN2.

The Embodiment 1 avoids a delay in transmission of the torque command value TESC* and the like from the brake controller 50 to the motor controller 100 by connecting the brake controller 50 to the first CAN bus CAN1. The Embodiment 2 differs from the Embodiment 1 in that the brake controller 50 is interposed in the second connection bus CAN4 so that signals may be transmitted to not only the first CAN bus CAN1 but also the second CAN bus CAN2 without response delay. As the result, the Embodiment 2 includes more connection ports for CAN communication wires, so that the number of telecom chips installed is increased. On the other hand, information can be transmitted to every CAN communication wire without response delay.

(19) Provided is the electric vehicle control system according to the system described in (8), wherein the CAN communication includes the first CAN bus CAN1, the second CAN bus CAN2 arranged in parallel to the first CAN bus CAN1, and the first connection bus CAN3 and the second connection bus CAN4, which connect the first CAN bus CAN1 and the second CAN bus CAN2 to each other; the first connection bus CAN3 is connected to the vehicle controller 110; the second connection bus CAN4 is connected to the brake controller 50; the first CAN bus CAN1 is connected to the motor controller 100 and the inverter 10 (component) for driving the electric motor 1; the second CAN bus CAN2 is connected to the power steering controller 20 (power steering device) and the meter controller (velocity meter); the brake controller 50 transmits the calculated wheel velocities to the second connection bus CAN4; and the power steering controller 20 and the meter controller 22 receive the transmitted information about the wheel velocities from the second CAN bus CAN2 via the second connection bus CAN4. This enables the power steering controller 20 and the meter controller 22 to obtain the information about the wheel velocities without response delay, which enhances the response of the entire system.

Embodiment 3

Figure 20:
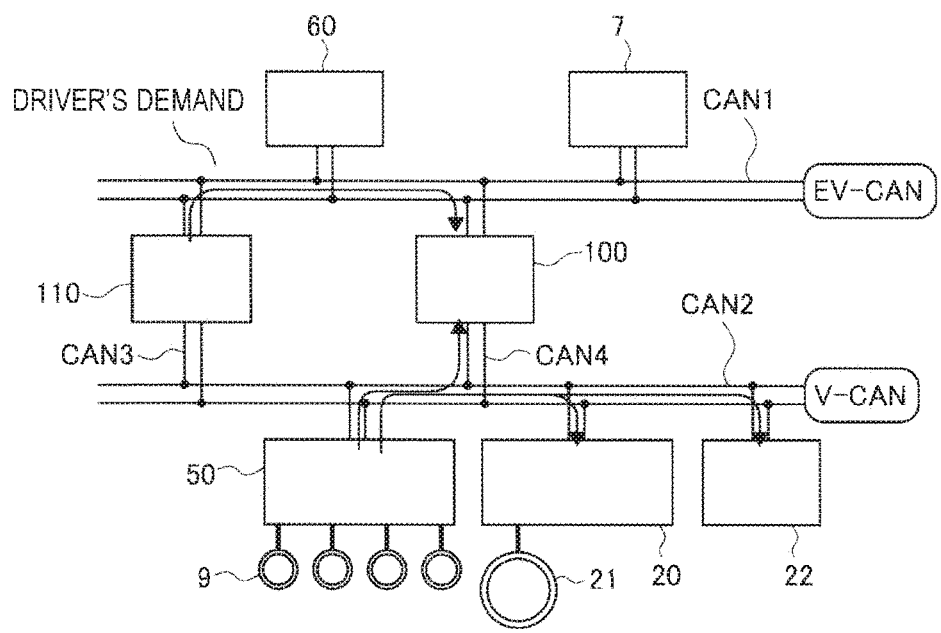
FIG. 20 is a schematic view showing connection of various controllers according to an Embodiment 3.

An Embodiment 3 will be now described. As the Embodiment 3 has a basic structure identical to that of the Embodiment 1, the following descriptions refer only to differences between these two embodiments. FIG. 20 is a schematic view showing connection of various controllers according to the Embodiment 3. In the electric vehicle of the Embodiment 3, the battery controller 60 and the inverter 10 configured to control the torque condition which effects between the drive wheels and a road surface are connected to the first CAN bus CAN1 as a power train system. A chassis system including the brake controller 50, the power steering controller 20 and the meter controller 22 is connected to the second CAN bus CAN2.

The first CAN bus CAN1 and the second CAN bus CAN2 are connected to each other by the first connection bus CAN3 and the second connection bus CAN4. The first connection bus CAN3 is provided with the vehicle controller 110. Information transmitted and received through the first CAN bus CAN1 is received by the vehicle controller 110 interposed in the first connection bus CAN3 and then outputted to the second CAN bus CAN2. Likewise, information transmitted and received through the second CAN bus CAN2 is received by the vehicle controller 110 interposed in the connection bus CAN3 and then outputted to the first CAN bus CAN1. The second connection bus CAN4 is provided with the motor controller 100. Information about wheel velocities, the slip control torque command value TESC* and the like, which are detected by the brake controller 50 connected to the second CAN bus CAN2, are outputted directly to the second connection bus CAN4 via second CAN bus CAN2.

The Embodiment 1 avoids a delay in transmission of the torque command value TESC* and the like from the brake controller 50 to the motor controller 100 by connecting the brake controller 50 to the first CAN bus CAN1. According to the Embodiment 3, the brake controller 50 is connected to the second CAN bus CAN2 as in the conventional art, and the motor controller 100 is interposed in the second connection bus CAN4. This enables the motor controller 100 to not only receive the driver's demand torque command value TDRV* from the vehicle controller 110 via the first connection bus CAN3, the first CAN bus CAN1, and the second connection bus CAN4 without response delay, but also receive the information about the wheel velocities and the slip control torque command value TESC* as signals from the brake controller 50 via the second CAN bus CAN2 and the second connection bus CAN4 without response delay. Since there are provided more connection ports for CAN communication wires of the motor controller 100, the number of telecom chips installed is increased. On the other hand, information can be received through every CAN communication wire without response delay.

(20) Provided is the electric vehicle control system according to the system described in (8), the CAN communication includes the first CAN bus CAN1, the second CAN bus CAN2 arranged in parallel to the first CAN bus CAN1, and the first connection bus CAN3 and the second connection bus CAN4, which connect the first CAN bus CAN1 and the second CAN bus CAN2 to each other; the first connection bus CAN3 is connected to the vehicle controller 110; the second connection bus CAN4 is connected to the motor controller 100; the first CAN bus CAN1 is connected to the inverter 10 (component) for driving the electric motor; the second CAN bus CAN2 is connected to the brake controller 50, the power steering controller 20 (power steering device), and the meter controller 22 (velocity meter); the brake controller 50 transmits the information about the calculated wheel velocities to the second CAN bus CAN2; and the power steering controller 20 and the meter controller 22 receive the transmitted information about the wheel velocities from the second CAN bus CAN2. This enables not only the motor controller 100 but also the power steering controller 20 and the meter controller 22 to receive the information about the wheel velocities without response delay, which enhances the response of the entire system.

Technical ideas other than claims, which can be recognized from the above-mentioned embodiments, will be provided below.

(1) Provided is an electric vehicle control system comprising a wheel velocity calculation unit configured to calculate velocities of wheels; an electric motor configured to generate a driving/braking force on the wheels; a hydraulic braking device configured to generate a hydraulic braking force on the wheels; a motor controller configured to control the electric motor according to a command value; a hydraulic controller configured to calculate the braking force to be generated on the wheels by using the calculated wheel velocities and control the hydraulic braking device so as to generate the calculated braking force; a vehicle controller configured to calculate a driver's demand torque command value according to a driver's accelerating or braking operation; a first communication device capable of communicating between the hydraulic controller and the motor controller; and a second communication device capable of communicating between the vehicle controller and the motor controller, the electric vehicle control system being provided with a control system in which the hydraulic controller calculates a motor torque command value as a command value for generating the driving/braking force in the electric motor according to the calculated wheel velocities; the hydraulic controller transmits the motor torque command value to the motor controller through the first communication device; the vehicle controller transmits the driver's demand torque command value to the motor controller through the second communication device; and the motor controller selects either one of the received motor torque command value and the received driver's demand torque command value as the command value for generating the driving/braking force to the electric motor.

(2) Provided is the electric vehicle control system according to the system described in (1), wherein the motor controller transmits the information about the selected command value to the vehicle controller through the first communication device.

(3) Provided is the electric vehicle control system according to the system described in (2), wherein the vehicle controller includes a control system abnormality judgment unit configured to judge abnormality of the control system on the basis of the selected command value which has been received, the control state of the vehicle, and the driver's demand torque command value.

(4) Provided is the electric vehicle control system according to the system described in (3), wherein the control system abnormality judgment unit includes a hydraulic braking device abnormality judgment unit configured to make a judgment as to whether the hydraulic braking device is abnormal as the control state of the vehicle; and an acceleration slip control state judgment unit configured to make a judgment as to whether acceleration slip control is in operation and a deceleration slip control state judgment unit configured to make a judgment as to whether deceleration slip control is in operation, as the control state of the vehicle.

(5) Provided is the electric vehicle control system according to the system described in (4), wherein the control system abnormality judgment unit determines that there is abnormality when the judged state of the hydraulic braking device is normal, and the driver's demand torque is smaller than the selected command value during the acceleration slip control.

(6) Provided is the electric vehicle control system according to the system described in (4), wherein the control system abnormality judgment unit determines that there is abnormality when the judged state of the hydraulic braking device is normal, and the driver's demand torque is equal to or larger than the selected command value during the deceleration slip control.

(7) Provided is the electric vehicle control system according to the system described in (4), wherein the control system abnormality judgment unit determines that there is abnormality when difference between the driver's demand torque and the selected command value is equal to or larger than a predetermined value if the judged state of the hydraulic braking device is normal, and neither the acceleration slip control nor the deceleration slip control is in operation, or if the judged state of the hydraulic braking device is abnormal.

(8) Provided is the electric vehicle control system according to the system described in (1), wherein the first and second communication devices are CAN communication.

(9) Provided is the electric vehicle control system according to the system described in (8), wherein the CAN communication includes a first CAN bus, a second CAN bus arranged in parallel to the first CAN bus, and a connection bus connecting the first CAN bus and the second CAN bus to each other; the vehicle controller is interposed in the connection bus; and the motor controller and the hydraulic controller are connected to the first CAN bus.

(10) Provided is the electric vehicle control system according to the system described in (9), comprising an electric power steering device and a velocity meter control device, wherein the first CAN bus is connected to a component for driving the electric motor; the second CAN bus is connected to the power steering device and a velocity meter device; the hydraulic controller transmits information of the calculated wheel velocities to the first CAN bus; and the power steering device and the velocity meter receive the transmitted information of the wheel velocities from the second CAN bus via the vehicle controller.

(11) Provided is the electric vehicle control system according to the system described in (8), wherein the CAN communication includes the first CAN bus, the second CAN bus arranged in parallel to the first CAN bus, and the first and second connection buses connecting the first and second CAN buses to each other; the first connection bus is connected to the vehicle controller; the second connection bus is connected to the hydraulic controller; the first CAN bus is connected to the motor controller and the component for driving the electric motor; the second CAN bus is connected to the power steering device and a velocity meter; the hydraulic controller transmits the calculated wheel velocities to the second connection bus; and the power steering device and the velocity meter device receive the transmitted information of wheel velocities from the second CAN bus via the second connection bus.

(12) Provided is the electric vehicle control system according to the system described in (8), wherein the CAN communication includes the first CAN bus, the second CAN bus arranged in parallel to the first CAN bus, and the first and second connection buses connecting the first and second CAN buses to each other; the first connection bus is connected to the vehicle controller; the second connection bus is connected to the motor controller; the first CAN bus is connected to the component for driving the electric motor; the second CAN bus is connected to the hydraulic controller, the power steering device, and the velocity meter; the hydraulic controller transmits the information of the calculated wheel velocities to the second CAN bus; and the power steering device and the velocity meter receive the transmitted information of the wheel velocities from the second CAN bus.

(13) Provided is the electric vehicle control system comprising a vehicle controller configured to calculate a driver's demand torque command value according to a driver's accelerating or braking operation; a motor controller configured to control an electric motor which generates a driving/braking force on wheels according to a command value; and an actuator controller configured to calculate a vehicle demand torque command value according to vehicle behavior and control an actuator installed in the vehicle, wherein the motor controller controls the electric motor according to the driver's demand torque command value from the vehicle controller and the vehicle demand torque command value from the actuator controller.

(14) Provided is the electric vehicle control system according to the system described in (13), comprising a wheel velocity calculation unit configured to calculate the velocities of the wheels, the system being provided with a hydraulic braking device configured to generate a hydraulic braking force on the wheels as the actuator, wherein the actuator controller is a hydraulic controller configured to calculate the braking force to be generated on the wheels by using the calculated wheel velocities and control the hydraulic braking device so as to generate the calculated braking force.

(15) Provided is the electric vehicle control system according to the system described in (14), comprising a first communication device connecting the hydraulic controller and the motor controller to each other, and the second communication device connecting the vehicle controller and the motor controller to each other, wherein the hydraulic controller calculates a motor torque command value as a command value for generating a driving/braking force in the electric motor according to the calculated wheel velocities; the hydraulic controller transmits the motor torque command value to the motor controller via the first communication device; the vehicle controller transmits the driver's demand torque command value to the motor controller via the second communication device; and the motor controller selects either one of the received motor torque command value and the received driver's demand torque command value as the command for generating the driving/braking force in the electric motor.

(16) Provided is the electric vehicle control system according to the system described in (15), wherein the motor controller transmits information about the selected command value to the vehicle controller through the first communication device.

(17) Provided is the electric vehicle control system according to the system described in (13), wherein the vehicle controller includes a control system abnormality judgment unit configured to judge abnormality of the control system on the basis of the selected command value which has been received, the control state of the vehicle, and the driver's demand torque command value.

(18) Provided is the electric vehicle control system comprising a wheel velocity calculation unit configured to calculate velocities of wheels; an electric motor configured to generate a driving/braking force on the wheels; a hydraulic braking device configured to generate a hydraulic braking force on the wheels; a motor controller configured to control the electric motor according to a command value; a hydraulic controller configured to calculate the braking force to be generated on the wheels by using the calculated wheel velocities and control the hydraulic braking device so as to generate the calculated braking force; a vehicle controller configured to calculate the driver's demand torque command value according to the driver's accelerating or braking operation; and a CAN communication wire connecting the hydraulic controller, the motor controller and the vehicle controller, the electric vehicle control system being provided with a control system in which the hydraulic controller calculates a motor torque command value as a command value for generating a driving/braking force in the electric motor according to the calculated wheel velocities; the hydraulic controller transmits the motor torque command value to the motor controller through the CAN communication wire; the vehicle controller transmits the driver's demand torque command value to the motor, controller through the CAN communication wire; and the motor controller selects either one of the received motor torque command value and the received driver's demand torque command value as the command value for generating the driving/braking force in the electric motor.

(19) Provided is the electric vehicle control system according to the system described in (18), wherein the motor controller transmits information about the selected command value to the vehicle controller through the CAN communication wires.

(20) Provided is the electric vehicle control system according to the system described in (19), wherein the vehicle controller includes a control system abnormality judgment unit configured to judge abnormality of the control system on the basis of the selected command value which has been received, the control state of the vehicle, and the driver's demand torque command value.

According to the foregoing embodiments, the first communication device makes it possible to transmit the motor torque command value from the hydraulic controller to the motor controller without the vehicle controller, and secure good response and slip stopping property with respect to changes in the road surface condition.

The foregoing descriptions are related only to several embodiments of the invention. It should be easily understandable by a person skilled in the art that the embodiments illustrated above may be modified or improved in various ways without substantial deviation from the new teachings and advantages of the invention. It is therefore intended that any embodiments added with such modification or improvement are included in the technical scope of the invention.

The present application claims priority under Japanese Patent Application No. 2013-178904 filed on Aug. 30, 2013. The entire disclosure of Japanese Patent Application No. 2013-178904 filed on Aug. 30, 2013, including the description, claims, drawings and abstract, is incorporated herein by reference in its entirety.

The entire disclosure of Japanese Unexamined Patent Application Publication No. 2007-74817 (Patent Document 1) including description, claims, drawings and abstract is incorporated herein by reference in its entirety.

REFERENCE SIGNS LIST

1 electric motor; 2 resolver; 3 differential gear; 3a deceleration mechanism; 4 drive shaft; 5 hydraulic unit; 5a hydraulic pipe; 6 high-voltage battery; 7 converter; 8 battery for accessories; 9 wheel velocity sensor; 10 inverter; 20 power steering controller; 21 steering angle sensor; 22 meter controller; 50 brake controller; 51 traction control unit; 60 battery controller; 100 motor controller; 101 selector switch; 103 vibration-suppression control information calculation unit; 104 vibration-suppression control unit; 105 motor current control unit; 110 vehicle controller; 110a control system abnormality judgment unit; 111 driver's demand torque calculation unit; 511 drive wheel velocity calculation unit; 512 vehicle body velocity estimation unit; 513 target drive wheel velocity reference value calculation unit; 514 unit for calculating acceleration slip control initiation velocity; 515 unit for calculating acceleration slip control termination velocity; 516 acceleration slip control flag calculation unit; 517 target drive wheel velocity calculation unit; 518 unit for calculating an acceleration slip control torque command value; 519 unit for calculating a slip control torque command value; CAN1 first CAN bus; CAN2 second CAN bus; CAN3 first connection bus; CAN4 second connection bus; FAExecOK acceleration slip control implementation permission flag; FA acceleration slip control flag; FDExecOK deceleration slip control implementation permission flag; FD deceleration slip control flag; FH ESC state flag; FTQR flag indicative of a torque control state; W/C wheel cylinder

The invention claimed is:

1. An electric vehicle control system comprising:
a wheel velocity calculation unit configured to calculate velocities of wheels;
an electric motor configured to generate a driving/braking force on the wheels;
a hydraulic braking device configured to generate a hydraulic braking force on the wheels;
a motor controller configured to control the electric motor according to a command value;
a hydraulic controller configured to calculate the braking force to be generated on the wheels by using the calculated wheel velocities and control the hydraulic braking device so as to generate the calculated braking force;
a vehicle controller configured to calculate a driver's demand torque command value according to a driver's accelerating or braking operation;
a first communication device configured to communicate between the hydraulic controller and the motor controller without the vehicle controller; and
a second communication device configured to communicate between the vehicle controller and the motor controller, the electric vehicle control system being provided with a control system in which:
the hydraulic controller is configured to calculate a motor torque command value as the command value for generating a driving/braking force in the electric motor according to the calculated wheel velocities;
the hydraulic controller is configured to transmit the motor torque command value to the motor controller through the first communication device without the vehicle controller;
the vehicle controller is configured to transmit the driver's demand torque command value to the motor controller through the second communication device; and
the motor controller is configured to select either one of the received motor torque command value or the received driver's demand torque command value as the command value for generating the driving/braking force in the electric motor.

2. The electric vehicle control system of claim 1, wherein:
the motor controller is configured to transmit information about the selected command value to the vehicle controller through the first communication device.

3. The electric vehicle control system of claim 1, wherein:
the vehicle controller includes a control system abnormality judgment unit configured to judge abnormality of the control system on the basis of the selected command value which has been received, a control state of the vehicle, and the driver's demand torque command value.

4. The electric vehicle control system of claim 3, wherein:
the control system abnormality judgment unit includes a hydraulic braking device abnormality judgment unit configured to make a judgment as to whether a hydraulic braking device is abnormal as the control state of the vehicle, and an acceleration slip control state judgment unit configured to make a judgment as to whether acceleration slip control is in operation as the control state of the vehicle and a deceleration slip control state judgment unit configured to make a judgment as to whether deceleration slip control is in operation as the control state of the vehicle.

5. The electric vehicle control system of claim 4, wherein:
the control system abnormality judgment unit is configured to determine that there is an abnormality when the driver's demand torque command value is smaller than the selected command value if the judged state of the hydraulic braking device is normal, and the acceleration slip control is in operation.

6. The electric vehicle control system of claim 4, wherein:
the control system abnormality judgment unit is configured to determine that there is an abnormality when the driver's demand torque command value is larger than the selected command value if the judged state of the hydraulic braking device is normal, and the deceleration slip control is in operation.

7. The electric vehicle control system of claim 4, wherein:
the control system abnormality judgment unit is configured to determine that there is an abnormality when difference between the driver's demand torque command value and the selected command value is equal to or larger than a predetermined value if the judged state of the hydraulic braking device is normal and neither the acceleration slip control nor the deceleration slip control is in operation, or if the judged state of the hydraulic braking device is abnormal.

8. The electric vehicle control system of claim 1, wherein:
the first communication device and the second communication device are CAN communication devices.

9. The electric vehicle control system of claim 8, wherein:
the CAN communication includes a first CAN bus, a second CAN bus arranged in parallel to the first CAN bus, and a connection bus connecting the first CAN bus and the second CAN bus to each other; and
the vehicle controller is interposed in the connection bus, and the motor controller and the hydraulic controller are connected to the first CAN bus.

10. The electric vehicle control system of claim 8, comprising an electric power steering device and a velocity meter control device, wherein:
the first CAN bus is connected to a component for driving the electric motor, and the second CAN bus is connected to the power steering device and a velocity meter device;
the hydraulic controller is configured to transmit information of the calculated wheel velocities to the first CAN bus; and
the power steering device and a velocity meter are configured to receive the transmitted information of the wheel velocities from the second CAN bus via the vehicle controller.

11. The electric vehicle control system of claim 8, wherein:
the CAN communication includes a first CAN bus, a second CAN bus arranged in parallel to the first CAN bus, and first and second connection buses connecting the first and second CAN buses to each other;
the first connection bus is connected to the vehicle controller, and the second connection bus is connected to the hydraulic controller;
the first CAN bus is connected to the motor controller and a component for driving the electric motor;
the second CAN bus is connected to the power steering device and a velocity meter;
the hydraulic controller is configured to transmit the calculated wheel velocities to the second connection bus; and the power steering device and a velocity meter device are configured to receive the transmitted information of the wheel velocities from the second CAN bus via the second connection bus.

12. The electric vehicle control system of claim 8, wherein:
the CAN communication includes a first CAN bus, a second CAN bus arranged in parallel to the first CAN bus, and first and second connection buses connecting the first and second CAN buses;
the first connection bus is connected to the vehicle controller, and the second connection bus is connected to the motor controller;
the first CAN bus is connected to a component for driving the electric motor;
the second CAN bus is connected to the hydraulic controller, the power steering device, and a velocity meter; and
the hydraulic controller is configured to transmit information of the calculated wheel velocities to the second CAN bus, and the power steering device and the velocity meter are configured to receive the transmitted information of the wheel velocities from the second CAN bus.

13. An electric vehicle control system comprising:
a vehicle controller configured to calculate a driver's demand torque command value according to a driver's accelerating or braking operation;
a motor controller configured to control an electric motor which generates a driving/braking force according to a command value; and
an actuator controller configured to calculate a vehicle demand torque command value according to vehicle behavior and control an actuator installed in the vehicle, wherein:
the motor controller is configured to select, as the command value, either of the driver's demand torque command value from the vehicle controller or the vehicle demand torque command value received from the actuator controller without the vehicle controller, to control the electric motor.

14. The electric vehicle control system of claim 13, comprising:
a wheel velocity calculation unit configured to calculate velocities of wheels, the electric vehicle control system being provided with a hydraulic braking device configured to generate a hydraulic braking force on the wheels as the actuator,
wherein the actuator controller is a hydraulic controller configured to calculate a braking force to be generated on the wheels by using the calculated wheel velocities and control the hydraulic braking device so as to generate the calculated braking force.

15. The electric vehicle control system of claim 14, comprising:
a first communication device connecting the hydraulic controller and the motor controller to each other; and
a second communication device connecting the vehicle controller and the motor controller to each other, wherein:
the hydraulic controller is configured to calculate a motor torque value as a command value for generating a driving/braking force in the electric motor according to the calculated wheel velocities;
the hydraulic controller is configured to transmit the motor torque command value to the motor controller via the first communication device;

the vehicle controller is configured to transmit the driver's demand torque command value to the motor controller via the second communication device; and
the motor controller is configured to select either one of the received motor torque command value or the received driver's demand torque command value as the command value for generating the driving/braking force in the electric motor.

16. The electric vehicle control system of claim 15, wherein:
the motor controller is configured to transmit information about the selected command value to the vehicle controller through the first communication device.

17. The electric vehicle control system of claim 16, wherein:
the vehicle controller includes a control system abnormality judgment unit configured to judge an abnormality of the control system on the basis of the selected command value which has been received, a control state of the vehicle, and the driver's demand torque command value.

18. An electric vehicle control system comprising:
a wheel velocity calculation unit configured to calculate velocities of wheels;
an electric motor configured to generate a driving/braking force on the wheels;
a hydraulic braking device configured to generate a hydraulic braking force on the wheels;
a motor controller configured to control the electric motor according to a command value;
a hydraulic controller configured to calculate a braking force to be generated on the wheels by using the calculated wheel velocities and control the hydraulic braking device so as to generate the calculated braking force;
a vehicle controller configured to calculate a driver's demand torque command value according to a driver's accelerating or braking operation; and
a CAN communication wire connecting the hydraulic controller, the motor controller and the vehicle controller, the electric vehicle control system being provided with a control system in which:
the hydraulic controller is configured to calculate a motor torque command value as the command value for generating a driving/braking force in the electric motor according to the calculated wheel velocities;
the hydraulic controller is configured to transmit the motor torque command value to the motor controller through the CAN communication wire without the vehicle controller;
the vehicle controller is configured to transmit the driver's demand torque command value to the motor controller through the CAN communication wire; and
the motor controller is configured to select either one of the received motor torque command value or the received driver's demand torque command value as the command value for generating the driving/braking force in the electric motor.

19. The electric vehicle control system of claim 18, wherein:
the motor controller is configured to transmit information about the selected command value to the vehicle controller through the CAN communication wire.

20. The electric vehicle control system of claim 19, wherein:
the vehicle controller includes a control system abnormality judgment unit configured to judge an abnormality of the control system on the basis of the selected command value which has been received, a control state of the vehicle, and the driver's demand torque command value.

\* \* \* \* \*